(12) United States Patent
Katzir et al.

(10) Patent No.: US 12,464,213 B2
(45) Date of Patent: Nov. 4, 2025

(54) MULTIPLEXED PHOTON EMITTER AND CAMERA CONFIGURATION FOR AN IMAGE ACQUISITION DEVICE

(71) Applicant: Orbotech Ltd., Yavne (IL)

(72) Inventors: Yigal Katzir, Rishon Lezion (IL); Ilia Lutsker, Kfar Saba (IL); Elie Meimoun, Jerusalem (IL)

(*) Notice: Subject to any disclaimer, the term of this patent is extended or adjusted under 35 U.S.C. 154(b) by 0 days.

(21) Appl. No.: 18/758,063

(22) Filed: Jun. 28, 2024

(65) Prior Publication Data

US 2024/0357221 A1  Oct. 24, 2024

Related U.S. Application Data

(63) Continuation of application No. 17/420,136, filed as application No. PCT/IL2020/050037 on Jan. 9, 2020, now abandoned.

(60) Provisional application No. 62/791,897, filed on Jan. 14, 2019.

(51) Int. Cl.
| | |
|---|---|
| H04N 23/56 | (2023.01) |
| G01N 21/00 | (2006.01) |
| G01N 21/17 | (2006.01) |
| G01N 21/88 | (2006.01) |
| G01N 21/956 | (2006.01) |
| G02B 5/00 | (2006.01) |
| G02B 27/30 | (2006.01) |
| H04N 23/55 | (2023.01) |
| H04N 23/90 | (2023.01) |

(52) U.S. Cl.
CPC ............ *H04N 23/56* (2023.01); *G01N 21/00* (2013.01); *G02B 5/001* (2013.01); *G02B 27/30* (2013.01); *H04N 23/55* (2023.01); *H04N 23/90* (2023.01); *G01N 2021/177* (2013.01); *G01N 21/8806* (2013.01); *G01N 2021/95638* (2013.01)

(58) Field of Classification Search
CPC ........ H04N 23/56; H04N 23/55; H04N 23/90; G01N 21/00; G01N 21/8806; G01N 2021/177; G01N 2021/95638; G02B 5/001; G02B 27/30; G02B 19/0028; G02B 19/0052; G02B 19/0061; G02B 26/10
See application file for complete search history.

(56) References Cited

U.S. PATENT DOCUMENTS

| | | | | |
|---|---|---|---|---|
| 2005/0128920 A1* | 6/2005 | Itonaga | ............... | G11B 7/13922 369/112.22 |
| 2011/0069507 A1* | 3/2011 | Haugan | ................ | G02B 6/0096 362/551 |
| 2012/0133920 A1* | 5/2012 | Skunes | .................. | H04N 7/188 356/23 |
| 2018/0164567 A1* | 6/2018 | Chan | .................... | G02B 21/084 |

\* cited by examiner

*Primary Examiner* — Thanh Luu
*Assistant Examiner* — Mai Thi Ngoc Tran
(74) *Attorney, Agent, or Firm* — Hodgson Russ LLP

(57) ABSTRACT

An image acquisition device including a first plurality of cameras arranged in a mutually spaced configuration, each having a field of view, each field of view lying in a plane and a second plurality of photon emitters arranged in a multiplicity of generally circumferential arrangements about each camera of the first plurality of cameras, at least one photon emitter within the generally circumferential arrangement directing light to a field of view of one of the first plurality of cameras that is not the closest field of view thereto.

31 Claims, 26 Drawing Sheets

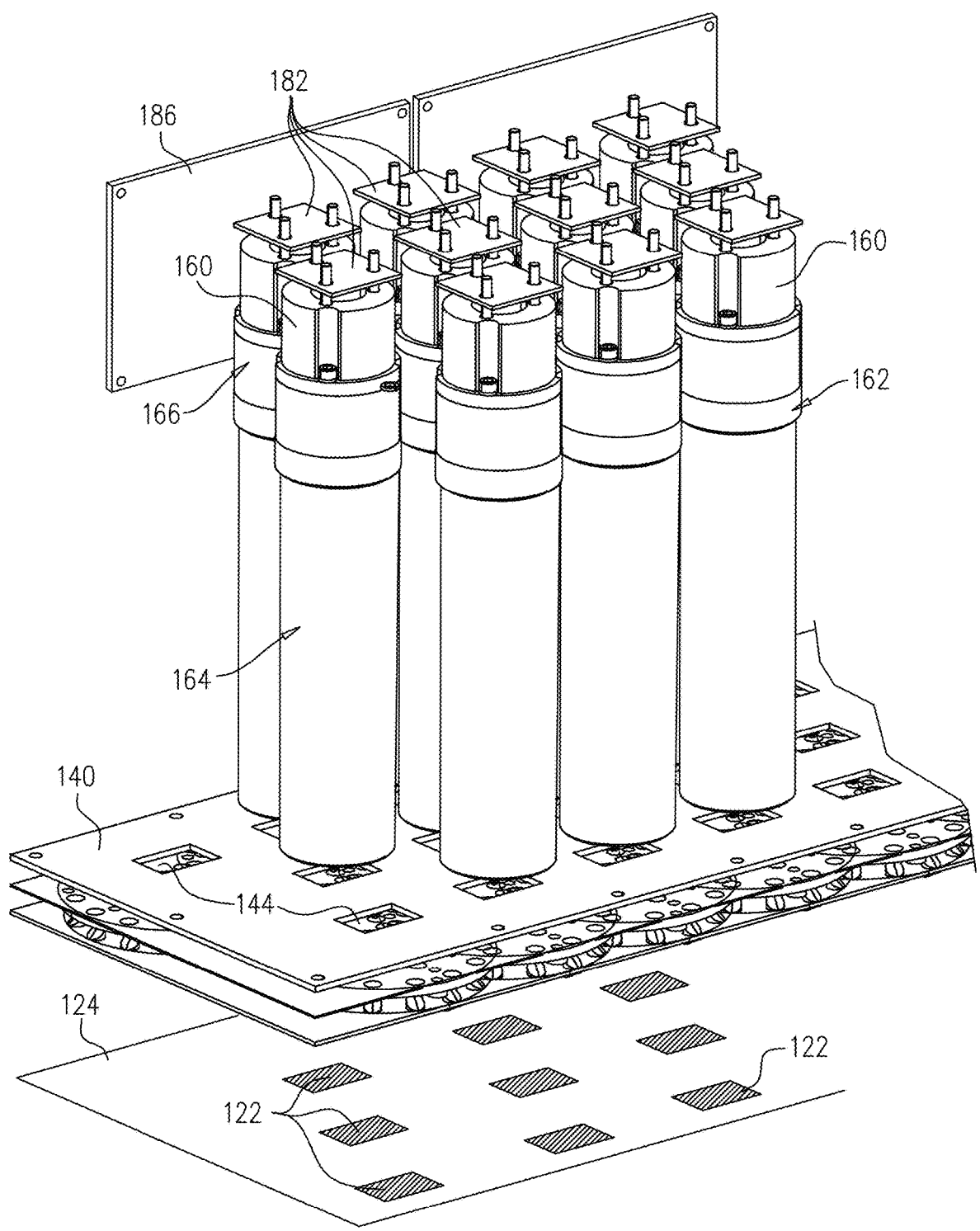

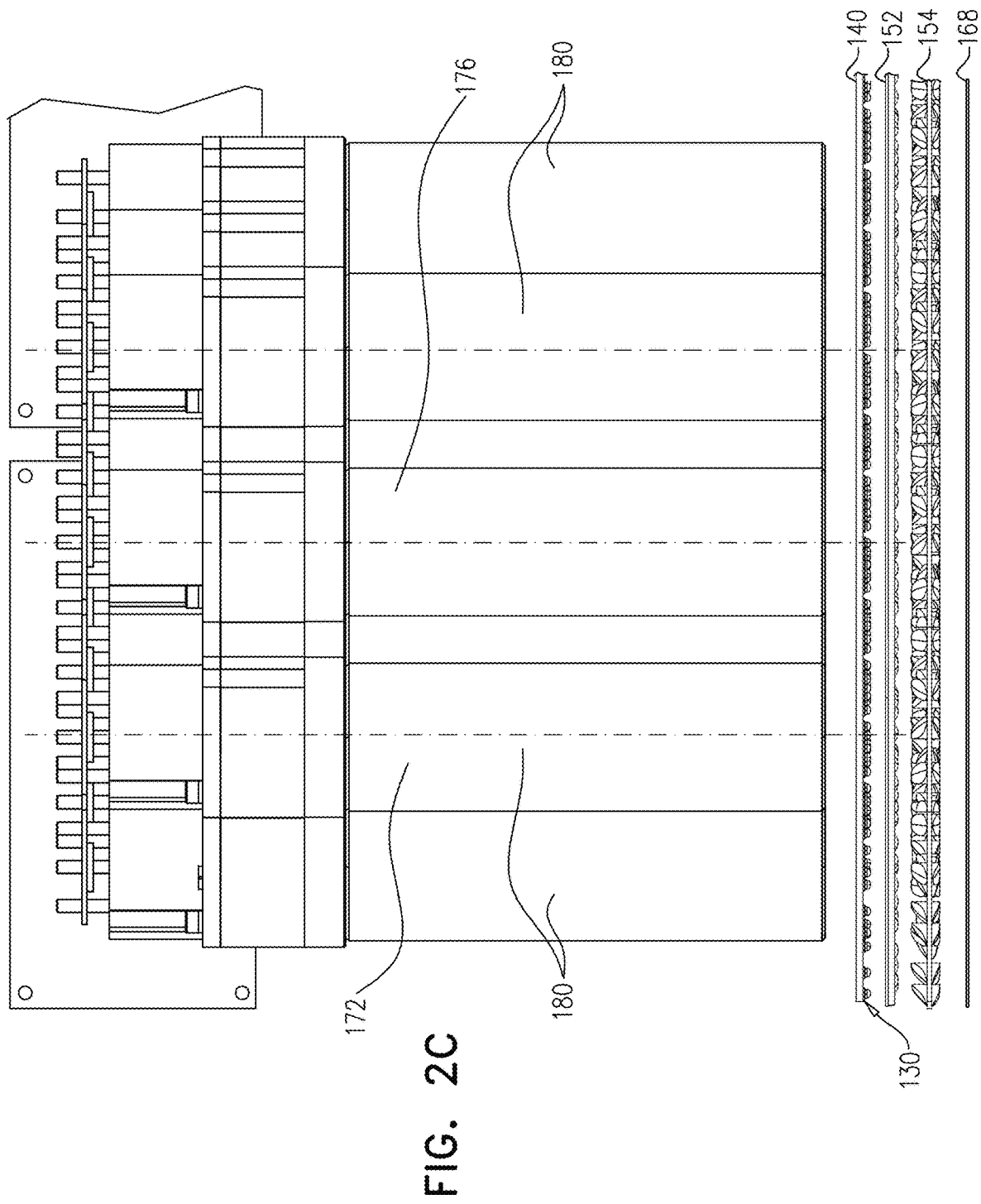

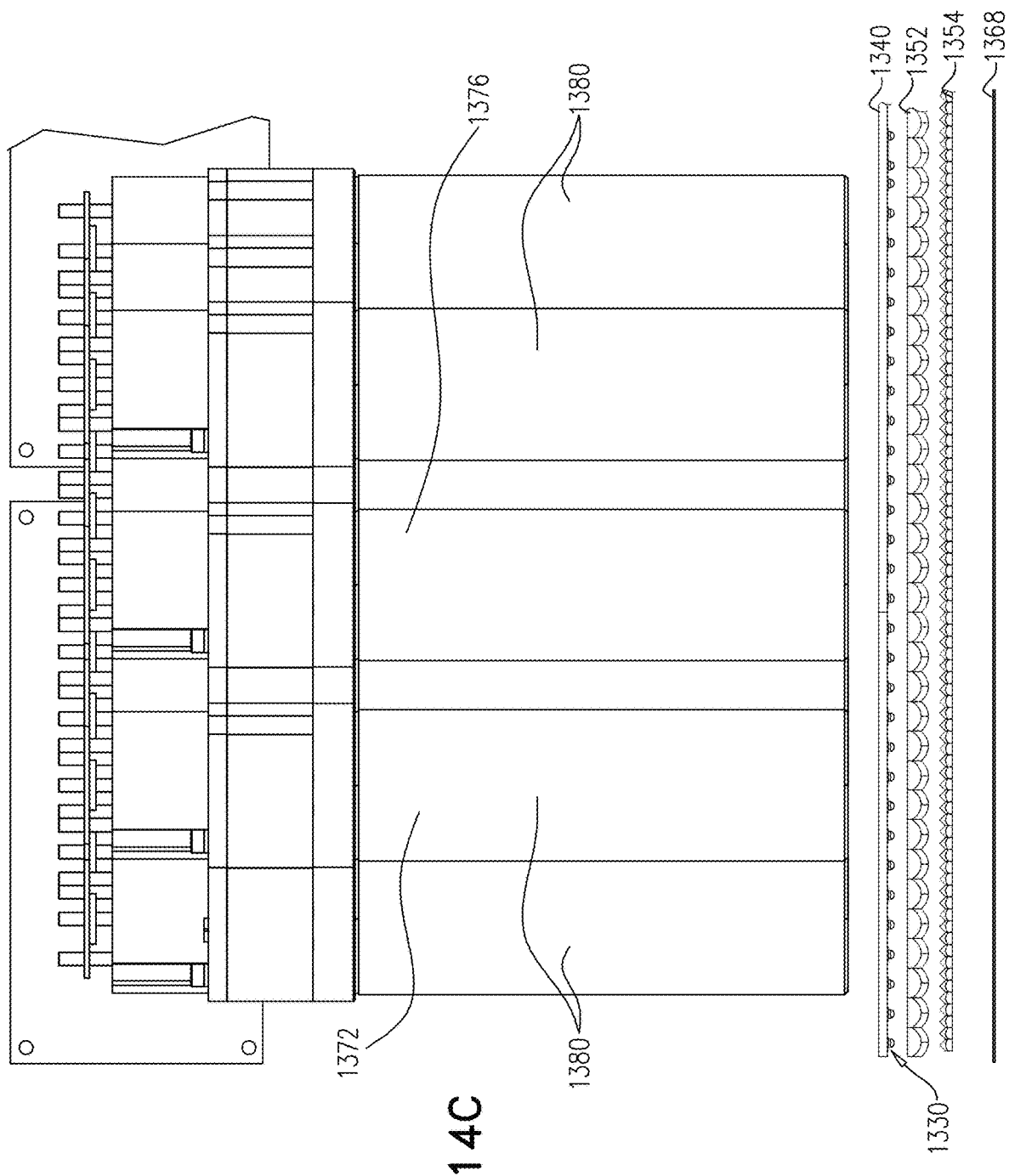

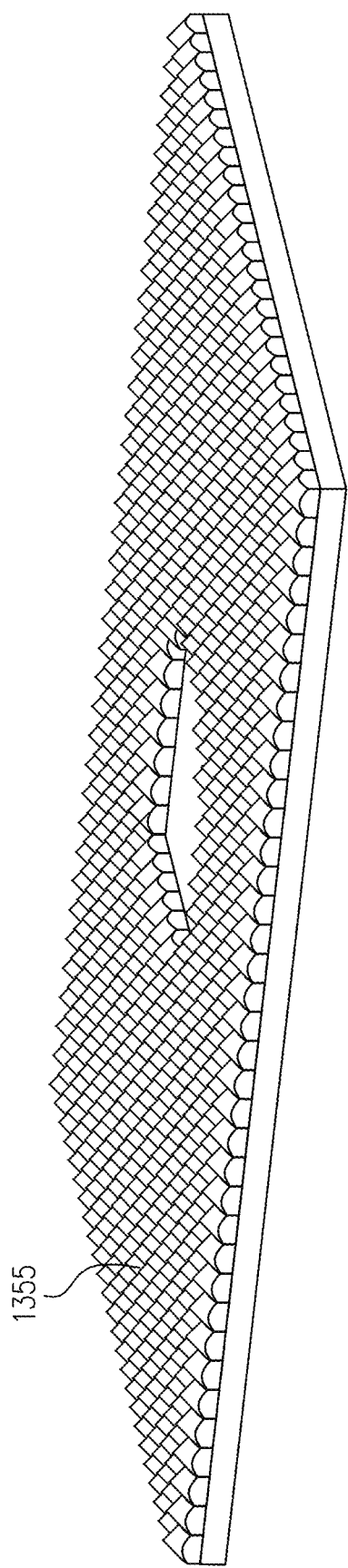

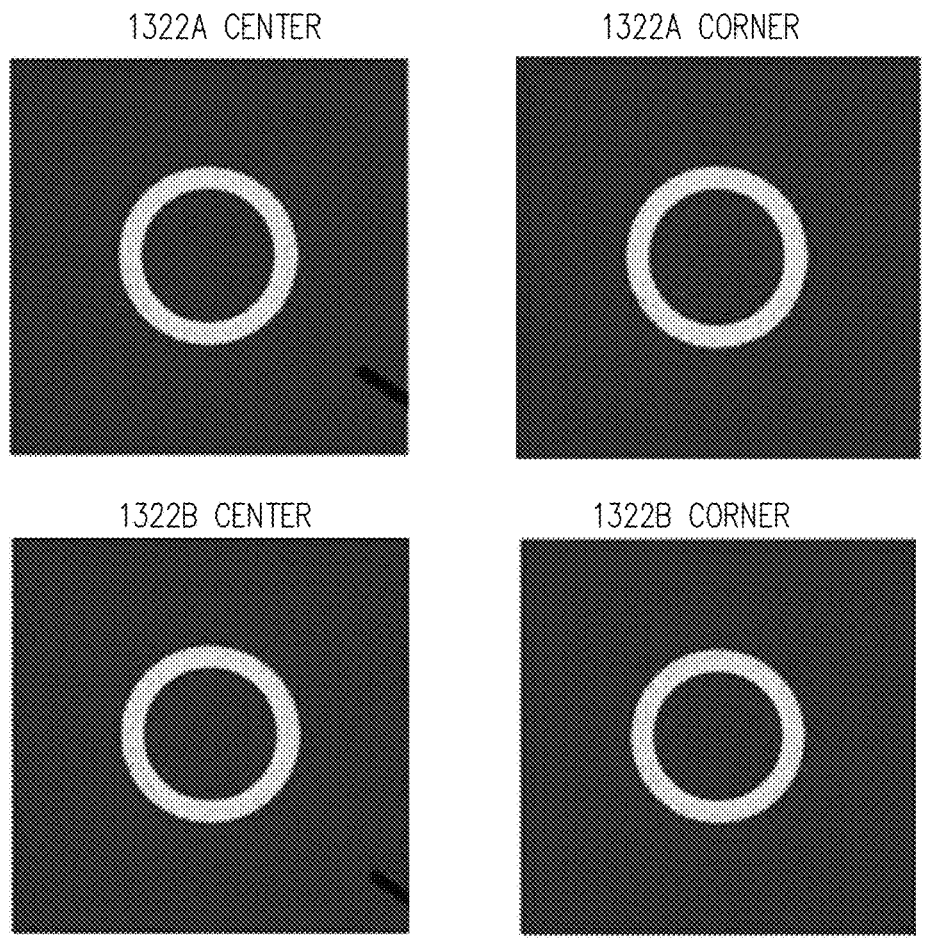
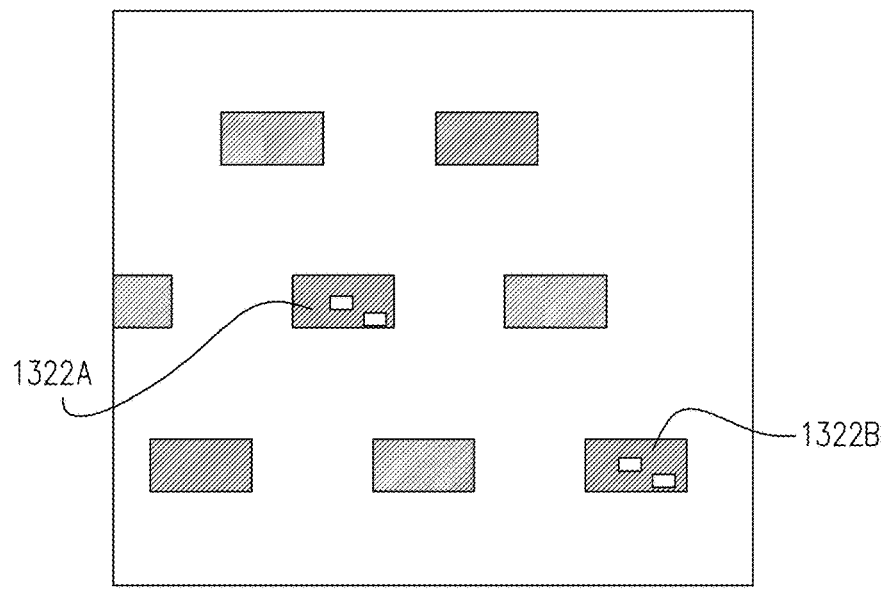
FIG. 18

MULTIPLEXED PHOTON EMITTER AND CAMERA CONFIGURATION FOR AN IMAGE ACQUISITION DEVICE

CROSS-REFERENCE TO RELATED APPLICATIONS

This application is a continuation of U.S. application Ser. No. 17/420,136 filed Jun. 30, 2021, the disclosure of which is hereby incorporated by reference.

FIELD OF THE INVENTION

The present invention relates generally to optical systems and more particularly to image acquisition devices for use in optical systems.

BACKGROUND OF THE INVENTION

Various types of optical systems including image acquisition devices are known in the art.

SUMMARY OF THE INVENTION

The present invention seeks to provide a multiplexed, high resolution, high throughput, highly compact, easily manufacturable image acquisition device for use in optical systems, in particular optical scanning systems. The invention seeks to achieve these goals while at the same time providing a relatively intense and both spatially and angularly substantially uniform illumination. The invention is particularly useful for fast and high accuracy reading of registration fiducial marks in production systems for manufacturing electronic substrates such as printed circuit boards, semiconductor wafers, chip packaging substrates and solar panels.

There is thus provided in accordance with a preferred embodiment of the present invention an image acquisition device including a first plurality of cameras arranged in a mutually spaced configuration, each having a field of view, each field of view lying in a plane and a second plurality of photon emitters arranged in a multiplicity of generally circumferential arrangements about each camera of the first plurality of cameras, at least one photon emitter within the generally circumferential arrangement directing light to a field of view of one of the first plurality of cameras that is not the closest field of view thereto.

Preferably, the mutually spaced configuration of the first plurality of cameras includes a staggered array of rows of cameras, fields of view of the first plurality of cameras being at least partially overlapping when viewed in a direction generally perpendicular to a direction of the rows.

Preferably, the plane is a common plane occupied by each field of view.

Preferably, the plane coincides with a surface of a substrate to be imaged by the image acquisition device.

Preferably, each camera defines a camera axis, each generally circumferential arrangement being centrally intersected by the camera axis.

Preferably, the photon emitter includes an LED.

Preferably, each generally circumferential arrangement includes at least one ring of photon emitters.

Preferably, the at least one ring of photon emitters includes an inner ring of photon emitters and an outer ring of photon emitters, the inner and outer rings being generally concentric.

Preferably, photon emitters including the inner ring emit light of a first wavelength and photon emitters including the outer ring emit light of a second wavelength, the first and second wavelengths being mutually different.

Preferably, the photon emitters including the inner ring are IR LEDs and the photon emitters including the outer ring are amber LEDs.

In accordance with a preferred embodiment of the present invention, the field of view to which light is directed by the photon emitter is entirely illuminated by the photon emitter.

Preferably, the image acquisition device also includes an illumination platform having an upper surface and a lower surface, the upper surface being proximal to the first plurality of cameras, the lower surface being distal from the plurality of cameras, the second plurality of photon emitters being mounted on the lower surface.

Preferably, a multiplicity of apertures is formed in the illumination platform, each aperture allowing viewing therethrough of the field of view by the camera.

Preferably, each generally circumferential arrangement of photon emitters circumferentially surrounds each aperture.

Preferably, each camera includes a telecentric lens.

Preferably, each aperture is generally rectangular.

Preferably, the image acquisition device also includes at least one collimator, for collimating the light.

Preferably, the at least one collimator is mounted on a collimator board.

Preferably, the collimator board is located adjacent to the illumination platform, between the illumination platform and the plane.

Preferably, the image acquisition device also includes at least one deflecting element for directing the light output by the at least one collimator.

Preferably, the at least one deflecting element is mounted on a deflector board.

Preferably, the deflector board is located abutting the collimator board.

Additionally or alternatively, the deflector board is formed monolithically with the collimator board.

In accordance with a preferred embodiment of the present invention, the at least one deflecting element directs the light output towards a single field of view.

In accordance with another preferred embodiment of the present invention, the at least one deflecting element directs the light output towards more than one field of view.

There is additionally provided in accordance with another preferred embodiment of the present invention an image acquisition device including a first plurality of cameras arranged in a mutually spaced configuration, each having a field of view, each field of view lying in a plane, a second plurality of photon emitters arranged in a multiplicity of generally circumferential arrangements, each generally circumferential arrangement illuminating a field of view, each generally circumferential arrangement, when projected on the plane of the field of view illuminated thereby, circumferentially surrounding the field of view and at least one photon emitter of at least one generally circumferential arrangement directing light to at least one other field of view in addition to the field of view illuminated by the at least one generally circumferential arrangement.

Preferably, the mutually spaced configuration of the first plurality of cameras includes a staggered array of rows of cameras, fields of view of the first plurality of cameras being at least partially overlapping when viewed in a direction generally perpendicular to a direction of the rows.

Preferably, the plane is a common plane occupied by each field of view.

Preferably, the plane coincides with a surface of a substrate to be imaged by the image acquisition device.

Preferably, each camera defines a camera axis, each generally circumferential arrangement being centrally intersected by the camera axis.

Preferably, the photon emitter includes an LED.

Preferably, each generally circumferential arrangement includes at least one ring of photon emitters.

Preferably, the at least one ring of photon emitters includes an inner ring of photon emitters and an outer ring of photon emitters, the inner and outer rings being generally concentric.

Preferably, photon emitters including the inner ring emit light of a first wavelength and photon emitters including the outer ring emit light of a second wavelength, the first and second wavelengths being mutually different.

Preferably, the photon emitters including the inner ring are IR LEDs and the photon emitters including the outer ring are amber LEDs.

Preferably, the image acquisition device also includes an illumination platform having an upper surface and a lower surface, the upper surface being proximal to the first plurality of cameras, the lower surface being distal from the plurality of cameras, the second plurality of photon emitters being mounted on the lower surface.

Preferably, a multiplicity of apertures is formed in the illumination platform, each aperture allowing viewing therethrough of the field of view by the camera.

Preferably, each generally circumferential arrangement of photon emitters circumferentially surrounds each aperture.

Preferably, each camera includes a telecentric lens.

Preferably, each aperture is generally rectangular.

Preferably, the image acquisition device also includes at least one collimator coupled to at least one photon emitter.

Preferably, the at least one collimator is mounted on a collimator board. Preferably, the collimator board is located adjacent to the illumination platform, between the illumination platform and the plane.

Preferably, the image acquisition device also includes at least one deflecting element coupled to the at least one collimator.

Preferably, the at least one deflecting element is mounted on a deflector board.

Preferably, the deflector board is located abutting the collimator board.

Additionally or alternatively, the deflector board is formed monolithically with the collimator board.

In accordance with a preferred embodiment of the present invention, the at least one collimator is coupled to the at least one photon emitter of the generally circumferential arrangement directing light to at least one other field of view in addition to the field of view illuminated by the generally circumferential arrangement, the at least one deflecting element directing the light to the at least one other field of view in addition to the field of view illuminated by the generally circumferential arrangement.

Preferably, the at least one deflecting element includes at least one prism having a plurality of exit facets angled to direct the light towards the at least one other field of view in addition to the field of view illuminated by the generally circumferential arrangement.

There is also provided in accordance with yet another preferred embodiment of the present invention an image acquisition device including a first plurality of cameras arranged in a mutually spaced configuration, each having a field of view, each field of view lying in a plane and a second plurality of photon emitters arranged in a multiplicity of arrangements about each camera of the first plurality of cameras, at least one photon emitter of the second plurality of photon emitters directing light to a field of view of at least one of the first plurality of cameras that is not the closest field of view thereto.

Preferably, the mutually spaced configuration of the first plurality of cameras includes a staggered array of rows of cameras, fields of view of the first plurality of cameras being at least partially overlapping when viewed in a direction generally perpendicular to a direction of the rows.

Preferably, the plane is a common plane occupied by each field of view.

Preferably, the plane coincides with a surface of a substrate to be imaged by the image acquisition device.

Preferably, each camera defines a camera axis, each arrangement being intersected by the camera axis.

Preferably, the photon emitter includes an LED.

Preferably, the image acquisition device also includes an illumination platform having an upper surface and a lower surface, the upper surface being proximal to the first plurality of cameras, the lower surface being distal from the plurality of cameras, the second plurality of photon emitters being mounted on the lower surface.

Preferably, a multiplicity of apertures is formed in the illumination platform, each aperture allowing viewing therethrough of the field of view by the camera.

Preferably, each arrangement of photon emitters surrounds each aperture.

Preferably, each camera includes a telecentric lens.

Preferably, each aperture is generally rectangular.

Preferably, the image acquisition device also includes at least one collimator, for collimating the light.

Preferably, the at least one collimator is mounted on a collimator board.

Preferably, the collimator board is located adjacent to the illumination platform, between the illumination platform and the plane.

Preferably, the image acquisition device also includes at least one deflecting element for directing the light output by the at least one collimator.

Preferably, the at least one deflecting element includes a third plurality of axicons.

Preferably, the third plurality of axicons includes an array of axicons having a density of between 4-10000 axicons/$cm^2$.

In accordance with a preferred embodiment of the present invention, the third plurality of axicons includes axicons having mutually similar optical properties.

In accordance with another preferred embodiment of the present invention, the third plurality of axicons includes axicons having mutually different optical properties.

BRIEF DESCRIPTION OF THE DRAWINGS

The present invention will be understood and appreciated more fully from the following detailed description, taken in conjunction with the drawings in which:

FIGS. 2A, 2B and 2C are simplified respective perspective, side and front view illustrations of a portion of an image acquisition device of the type shown in FIG. 1;

FIGS. 14A, 14B and 14C are simplified respective perspective, side and front view illustrations of a portion of an image acquisition device of the type shown in FIG. 13;

FIGS. 15A, 15B and 15C are simplified respective illustrations of an illumination assembly and components thereof, forming part of an image acquisition device of the type shown in FIGS. 13-14C, constructed and operative in accordance with a preferred embodiment of the present invention;

FIG. 18 is a simplified plot of simulated light output from an optical illumination module of the type shown in FIG. 16.

DETAILED DESCRIPTION OF PREFERRED EMBODIMENTS

Figure 1:
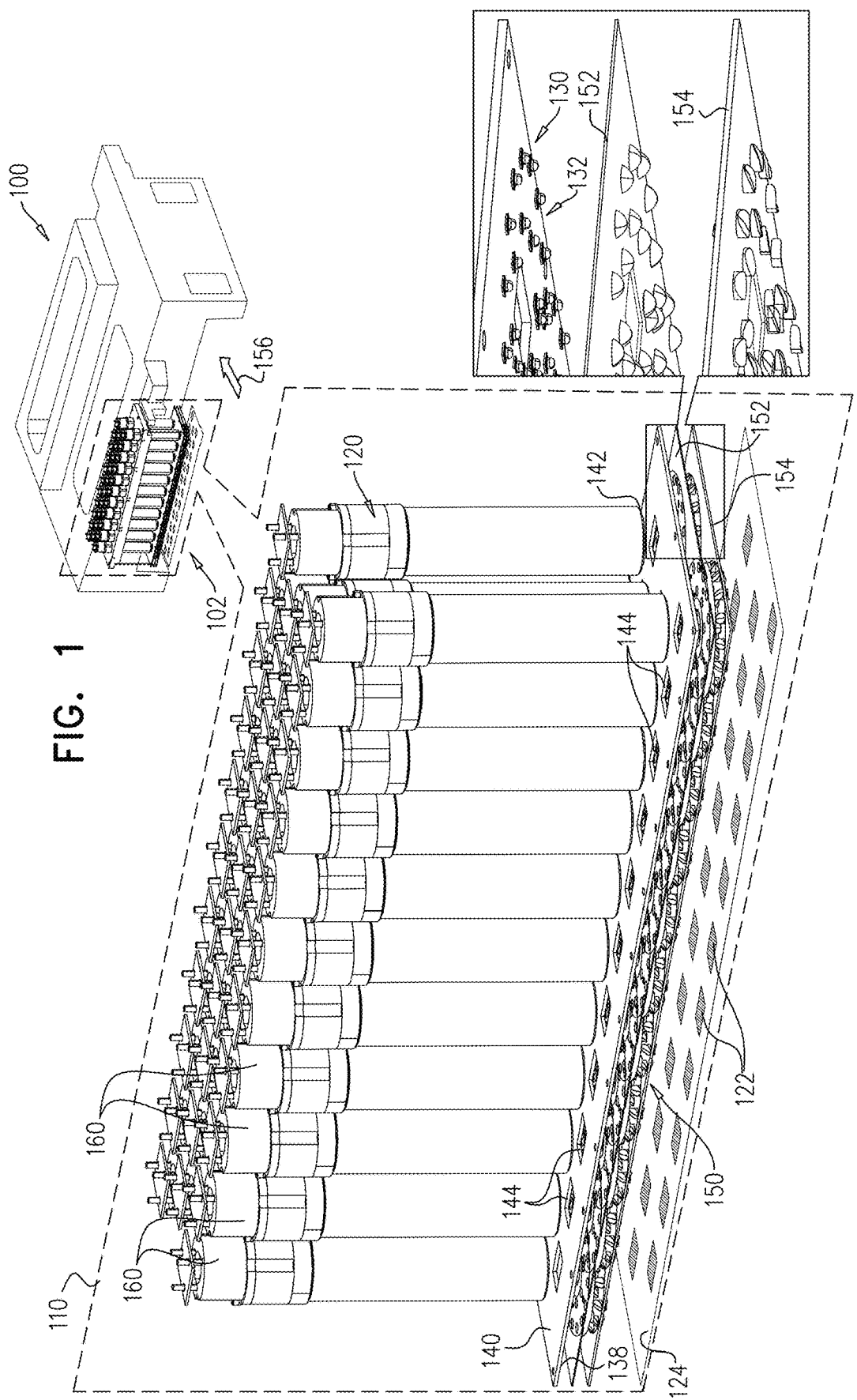
FIG. 1 is a simplified illustration of an optical system including an image acquisition device forming a part thereof, constructed and operative in accordance with a preferred embodiment of the present invention.

Reference is now made to FIG. 1, which is a simplified illustration of an optical system including an image acquisition device forming a part thereof, constructed and operative in accordance with a preferred embodiment of the present invention.

As seen in FIG. 1, there is provided an optical system 100 including an image acquisition device 102. Optical system 100 may be any type of system employing optical elements and benefitting from the inclusion of an image acquisition device therein, such as, by way of example only, an optical scanning system, optical inspection system, optical processing system or optical manufacturing system. Here, by way of example, optical system 100 is shown to be embodied in a form typical of an optical scanning system and image acquisition device 102 to be mounted thereon. It is appreciated, however, that this representation of optical system 100 and the location of image acquisition device 102 therein is illustrative only and may readily be varied in accordance with the design requirements of optical system 100.

Image acquisition device 102 preferably includes optical elements operative to illuminate a substrate handled by optical system 100 and to subsequently acquire an image thereof. Image acquisition device 102 may therefore be termed an optical head 102. As seen most clearly at an enlargement 110 showing an enlarged view of optical head 102, optical head 102 preferably includes a first plurality of cameras 120 arranged in a mutually spaced configuration, each camera having an associated field of view 122, each field of view 122 lying in a plane such as a plane 124. Plane 124 preferably coincides with a surface of the substrate to be imaged, such that fields of view 122 of cameras 120 lie on the substrate surface. In the case of a planar target, plane 124 occupied by the fields of view 122 may be a common plane, within which plane 124 all of fields of view 122 of cameras 120 lie. Alternatively, in the case of a non-planar substrate to be imaged, fields of view 122 of cameras 120 may lie in more than one plane.

Optical head 102 further preferably includes a second plurality of photon emitters 130 arranged in a multiplicity of generally circumferential arrangements 132 about each camera of first plurality of cameras 120, which photon emitters 130 preferably illuminate fields of view 122. It is a particular feature of a preferred embodiment of the present invention that at least one photon emitter within the generally circumferential arrangement 132 of photon emitters directs light to a field of view 122 of one of the first plurality of cameras 120 which is not the closest field of view to that photon emitter. Such an arrangement of plurality of photon emitters 130 with respect to plurality of cameras 120 allows plurality of photon emitters 130 to provide wide-angle generally uniform illumination of field of views 122 in a highly compact form factor, as is explained in greater detail henceforth with respect to FIGS. 3 and 4.

Second plurality of photon emitters 130 is preferably mounted on an underside 138 of an illumination platform 140. Illumination platform 140 is preferably located beneath entrance facets 142 of lenses of cameras 120, interfacing cameras 120 and fields of view 122, with underside 138 of illumination platform 140 distal from entrance facets 142. A multiplicity of apertures 144 is preferably formed in illumination platform 140, wherethrough light emanating from illuminated fields of view 122 arrives at cameras 120. Second plurality of photon emitters 130 is preferably circumferentially arranged with respect to apertures 144 in a non-overlapping configuration, so as to illuminate fields of view 122 without obscuring light emanating therefrom, as is detailed henceforth with reference to FIG. 4.

Light emitted by plurality of photon emitters 130 may be directed towards fields of view 122 in the manner described above by means of various beam shaping optical elements 150, which optical elements 150 may have collimating and/or deflecting functionalities. Such optical elements 150 may be mounted on one or more boards, such as a collimator board 152 and a deflector board 154, shown in FIG. 1 to be located adjacent to each other and to illumination platform 140. It is appreciated that collimator and deflector boards 152, 154 may be provided separate from illumination platform 140 or may be integrally formed therewith, such that plurality of photon emitters 130 and beam shaping optical elements 150 occupy a monolithic, multi-tiered platform. Further details concerning the preferable structure and function of the illuminator assemblies formed by photon emitters 130 in conjunction with beam shaping optical elements 150 are provided henceforth, with reference to FIGS. 5A-7.

First plurality of cameras 120 is preferably organized in a staggered array, comprising a series of generally parallel mutually offset rows forming a series of staggered columns. During scanning of a substrate by optical head 102, the substrate and optical head 102 are preferably in relative motion along a scan direction generally indicated by an arrow 156. Such motion may be by way of movement of the substrate in scan direction 156 as optical head 102 remains stationary, by way of movement of optical head 102 in scan direction 156 as the substrate remains stationary or by way of movement of both optical head 102 and the substrate.

As appreciated from consideration of FIG. 1, the scan direction 156 is preferably generally perpendicular to the direction of the rows of cameras 120, such that the direction of the rows defines a cross-scan direction. Plurality of cameras 120 are preferably mutually spaced apart in both a scan and cross-scan direction so as to allow single-pass scanning of a substrate, when the substrate and optical head 102 are in relative motion along scan direction 156.

Here, by way of example, first plurality of cameras 120 is seen to comprise 32 individual cameras 160 arranged in three staggered rows and capable of providing single-pass scanning of a target. It is appreciated, however, that first plurality of cameras 120 may comprise a greater or fewer number of individual cameras 160 arranged in a variety of array architectures, depending on the imaging requirements of optical system 100. In particular, a fewer number of cameras 120 than that illustrated may be employed, such that single-pass scanning of the entire substrate is not enabled. In such a case, movement along scan direction 156 may be complemented by a stepwise movement in the cross-scan direction, perpendicular to scan direction 156.

Figure 2B:
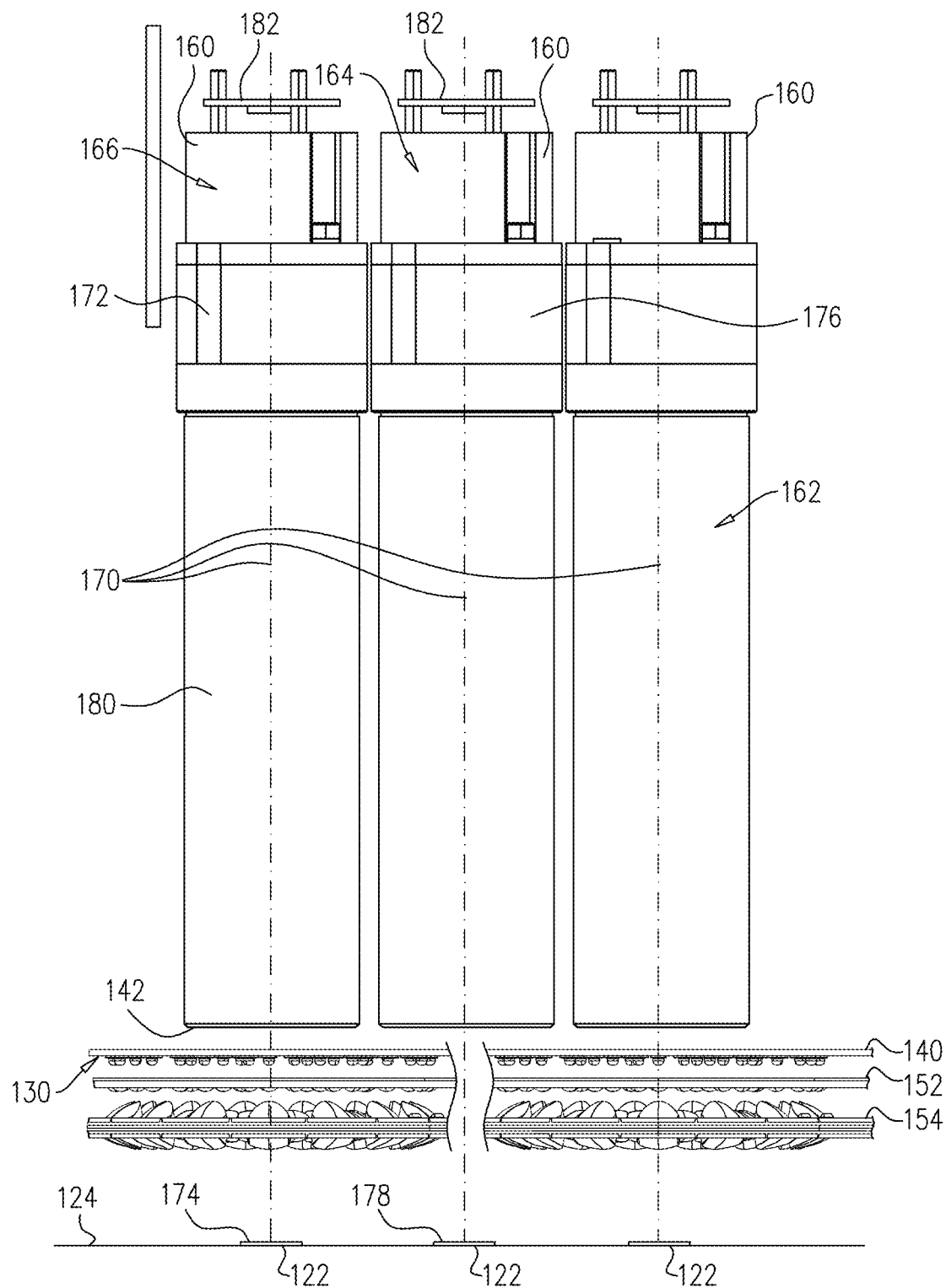

The arrangement and structure of plurality of cameras 120 may be best understood with reference to FIGS. 2A-2C, showing a representative portion of first plurality of cameras 120. As seen in FIGS. 2A-2C, first plurality of cameras 120 is preferably distributed over a first 162, a second 164 and a third 166 row in a partially overlapping arrangement as viewed in scan direction 156. As best appreciated from consideration of FIG. 2C, such a staggered, partially overlapping arrangement of cameras 160 provides a continuous lateral field of view 168 as viewed in scan direction 156, thereby allowing single-pass scanning of a target. By way of example, the 32 camera arrangement shown herein may provide single-pass scanning of a substrate having a width of approximately 600 mm in a cross-scan direction.

As seen most clearly in FIGS. 2B and 2C, each camera 160 defines a camera axis 170 and the field of view 122 of each camera 160 is that field of view lying directly beneath the camera 160 and intersected by the camera axis 170. Thus, by way of example, a first camera 172 has a first corresponding field of view 174, a second camera 176 has a second corresponding field of view 178 and so forth. Circumferential arrangements 132 of second plurality of photon emitters 130 are preferably generally centered about and intersected by camera axis 170 of each camera 160.

Each camera 160 preferably comprises a lens portion 180 and an associated camera board 182 connected thereto. Camera board 182 may be a printed circuit board (PCB) hosting an integrated-circuit sensor chip and electronics for camera driving and control. Camera boards 182 may be formed individually or, for manufacturing convenience, may be formed as a common element. The operation of plurality of cameras 120 may be additionally controlled by electronic circuitry formed on a set of control boards 186. By way of example, a group of eight individual cameras 160 may be connected to and controlled by a single control board 186 located posterior to the cameras 160. Control boards 186 may also house electronics for the control and driving of plurality of photon emitters 130. Control boards 186 may be cooperatively coupled to camera boards 182 so as to coordinate the operation of first plurality of cameras 120 and second plurality of photon emitters 130.

Lens portion 180 is particularly preferably embodied as a telecentric lens. A telecentric lens suitable for use in cameras 160 may be of the type commercially available from Schneider Optics of Bad Kreuznach, Germany; Edmund Optics of New Jersey, US; NET New Electronic Technology GMBH of Finning, Germany; and Opto-Engineering of Mantua, Italy.

As is known in the art, in telecentric lenses the image of the field of view is formed by light rays propagating substantially parallel to the lens axis 170, due to the manner in which light is captured by the telecentric lens. It is therefore understood by one skilled in the art that it is the telecentric nature of lens portions 180 in combination with the generally rectangular shape of the light sensitive region of the image sensor of camera board 182 that give rise to the generally rectangularly shaped fields of view 122 and the corresponding rectangularly shaped apertures 144 shown herein. It is appreciated, however, that lenses of types other than telecentric lenses may be incorporated in the first plurality of cameras 120 of the present invention, in which case modifications may be made as required in order to accommodate the shapes of the fields of view associated therewith.

As best appreciated from consideration of FIG. 2B, a width of fields of view 122 is considerably smaller than a diameter of the corresponding camera lens 180, consistent with the telecentric nature of camera lens 180. It is a particularly advantageous feature of the present invention that first plurality of cameras 120 is capable of providing single-pass scanning of a target despite the camera fields of view being considerably smaller than the camera lens diameter. By way of example, in the optical head 102 of the present invention, single pass scanning may be achieved despite fields of view 122 having a width of the order of approximately 20 mm less than a diameter of corresponding lenses 180.

This is in contrast to conventional single-pass optical imaging systems, in which single-pass scanning is typically enabled by the use of cameras having fields of view at least as large as the camera lens itself.

Figure 3:
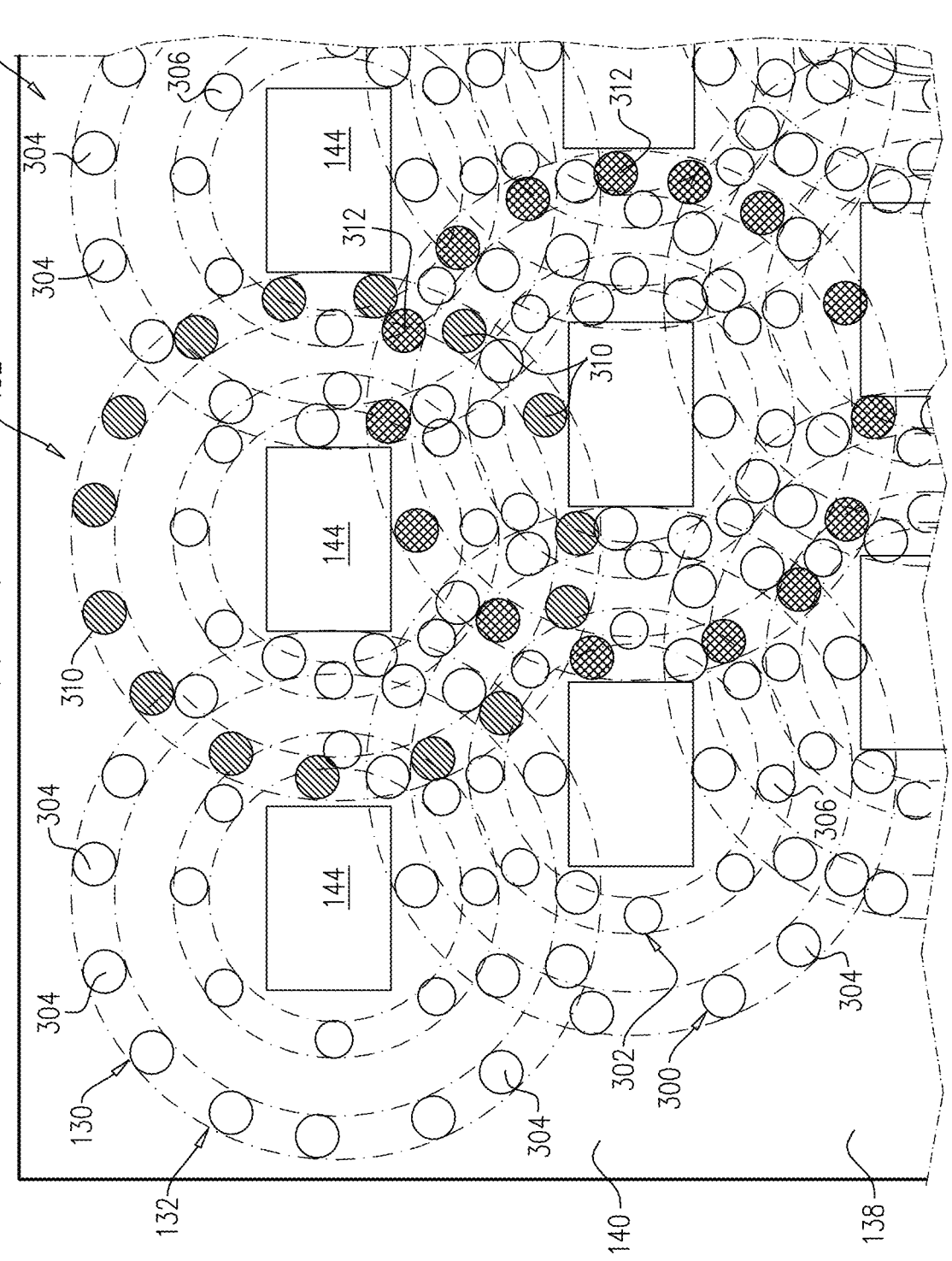
FIG. 3 is a simplified illustration of an arrangement of photon emitter assemblies on an illumination platform in an image acquisition device of the type shown in FIGS. 1-2C.

Reference is now made to FIG. 3, which is a simplified illustration of an arrangement of photon emitter assemblies on a portion of an illumination platform in an image acquisition device of the type shown in FIGS. 1-2C.

As seen in FIG. 3, second plurality of photon emitters 130 is arranged in generally circumferential arrangements 132 about apertures 144 on underside 138 of illumination board 140. Each circumferential arrangement 132 of photon emitters 130 is preferably embodied as at least one ring of photon emitters here comprising, by way of example, a pair of mutually concentric rings of photon emitters comprising an outer ring 300 and an inner ring 302. Each pair of mutually concentric outer and inner rings 300 and 302 of photon emitters 130 preferably circumferentially surrounds a corresponding aperture 144. It is appreciated, however, that circumferential arrangements 132 of photon emitters may alternatively comprise a greater or fewer number of rings of photon emitters surrounding each of apertures 144.

Photon emitters 130 are preferably embodied as LEDs. Preferably, LED members 304 of outer ring 300 provide light of a different wavelength than LED members 306 of inner ring 302. By way of example, LEDs 304 in outer ring 300 may be IR LEDs and LEDs 306 in inner ring 302 may be amber LEDs. It is appreciated, however, that LEDs 304, 306 respectively comprising inner and outer rings 300 and 302 may provide light of a variety of wavelengths and are not limited to providing light of mutually different wavelengths. Furthermore, it is appreciated that photon emitters 130 are not limited to being LEDs and may comprise any other suitable source of photons, such as diode lasers, vertical-cavity surface-emitting lasers (VCSEL), vertical-external-cavity surface-emitting-lasers (VECSEL), super-luminescent diodes or output ends of light emitting optical fibers.

It is a particular feature of a preferred embodiment of the present invention that second plurality of photon emitters 130 is arranged such that at least one of outer rings 300, here indicated by a ring of striped hatched LEDs 310, is overlapping with another one of outer rings 300, here indicated by a ring of crosshatched LEDs 312. As a result of the mutually overlapping arrangement of neighboring outer rings 300, at least one photon emitter member 304 of one of outer rings 300 lies within the generally circular boundary circumscribed by photon emitter members 304 of another one of outer rings 300. In the case of the two exemplary overlapping rings of photon emitters indicated by hatching in FIG. 3, it is seen that four crosshatched LEDs 312 lie within the boundary circumscribed by striped hatched LEDs 310 and four striped hatched LEDs 310 lie within the boundary circumscribed by crosshatched LEDs 312. As also depicted in FIG. 3, outer rings 300 may also overlap with inner rings 302 of a neighboring field of view 144. Additionally or alternatively, neighboring ones of inner rings 302 may mutually overlap, depending on the radius thereof.

Such a multiplexed overlapping arrangement of photon emitters may occupy substantially less volume than the volume that would be occupied by a non-multiplexed, non-overlapping arrangement of photon emitters, thereby leading to a significant reduction in the size of optical head 102. By way of example, optical head 120 of the type illustrated in FIG. 1 including 3 rows of cameras 160, may occupy a mechanical depth of 180-220 mm in scan direction 156. Notwithstanding the compactness of the arrangement of the present invention, the optical head 102 of the present invention is preferably capable of carrying out single-pass scanning of a substrate, due to the unique multiplexed arrangement of photon emitters 130 and partially overlapping cameras 120 employed therein. The total depth of optical head 102 constitutes an extra substrate scanning length. As would be appreciated by persons skilled in the art, the compact construction made possible by the present invention may translate into shorter scan travel, higher speed operation and lower cost scan stage.

Furthermore, since outer rings 300 and in certain embodiments also inner rings 302 are overlapping, the radius of each ring is less strictly limited by space constraints on illumination board 140. Outer ring 300 may have both a relatively large radius and substantially dense, azimuthally evenly spaced photon emitter placement. By way of example, each of rings 300 may have an effective optical radius in the range of 80-100 mm. Further by way of example, inner ring 302 may provide illumination subtending 20°-30° and outer ring 300 provide illumination subtending 30°-50° relative to the lens optical axis 170 at the center of field of view 144. Overlapping outer ring 300 and inner ring 302 thus functionally substitute for far bulkier distinct physical ring light assemblies, providing generally uniform, wide angle illumination of fields of view 144 for a given separation between cameras 120 and plane 124.

This is in contrast to conventional imaging systems, in which provision of uniform wide angle illumination typically necessitates either a large camera-substrate separation or an extremely expansive arrangement of illumination sources.

By way of example, entrance facets 142 of lenses 180 of cameras 120 may be separated from the fields of view 122 associated therewith, and hence from the substrate, by a distance in the range of approximately 50-100 mm, taken along camera axis 170. Particularly preferably, the substrate being imaged by cameras 120 may be separated from entrance facets 142 of lenses 180 of cameras 120 by a distance in the range of 70-90 mm.

This distance may correspond to approximately double to quadruple the length of a diagonal of each field of view 122. Were rings 300 not to be overlapping, such a separation between the cameras and fields of view would either necessitate an extremely large inter-camera spacing to give wide-angle illumination, or would result in very narrow or uneven angle illumination of the fields of view, both of which features would be undesirable and are avoided in the present invention. Additionally, due at least to the close substrate-camera spacing facilitated by the multiplexed partially overlapping arrangement of photon emitters in the present invention, the system of the present invention preferably provides high resolution images. By way of example, an optical head of the present invention may acquire images with a spatial resolution in the range of 6-30 μm (lens object-side numerical aperture in the range 0.01-0.05) and particularly preferably in the range of 8-16 μm in the green part of the visible spectrum (lens object-side numerical aperture in the range 0.02-0.04). The provision of high resolution images is a highly advantageous feature of the present invention and is in contrast to conventional imaging systems, in which much lower resolution images are typically acquired.

It is understood that the generally circumferential arrangements 132 of plurality of photon emitters 130, here depicted as comprising inner and outer rings 302 and 300, are not limited to being strictly circular. In actuality, circumferential arrangements 132 of photon emitters 130 may diverge from true circles within a tolerance of approximately ±20%. Furthermore, circumferential arrangements 132 of photon emitters 130 are not limited to being planar. Rather, circumferential arrangements 132 may be composed of photon emitters 304, 306 located at variety of azimuthal angles with respect to fields of view 144, within a tolerance of approximately ±15°.

Figure 4:
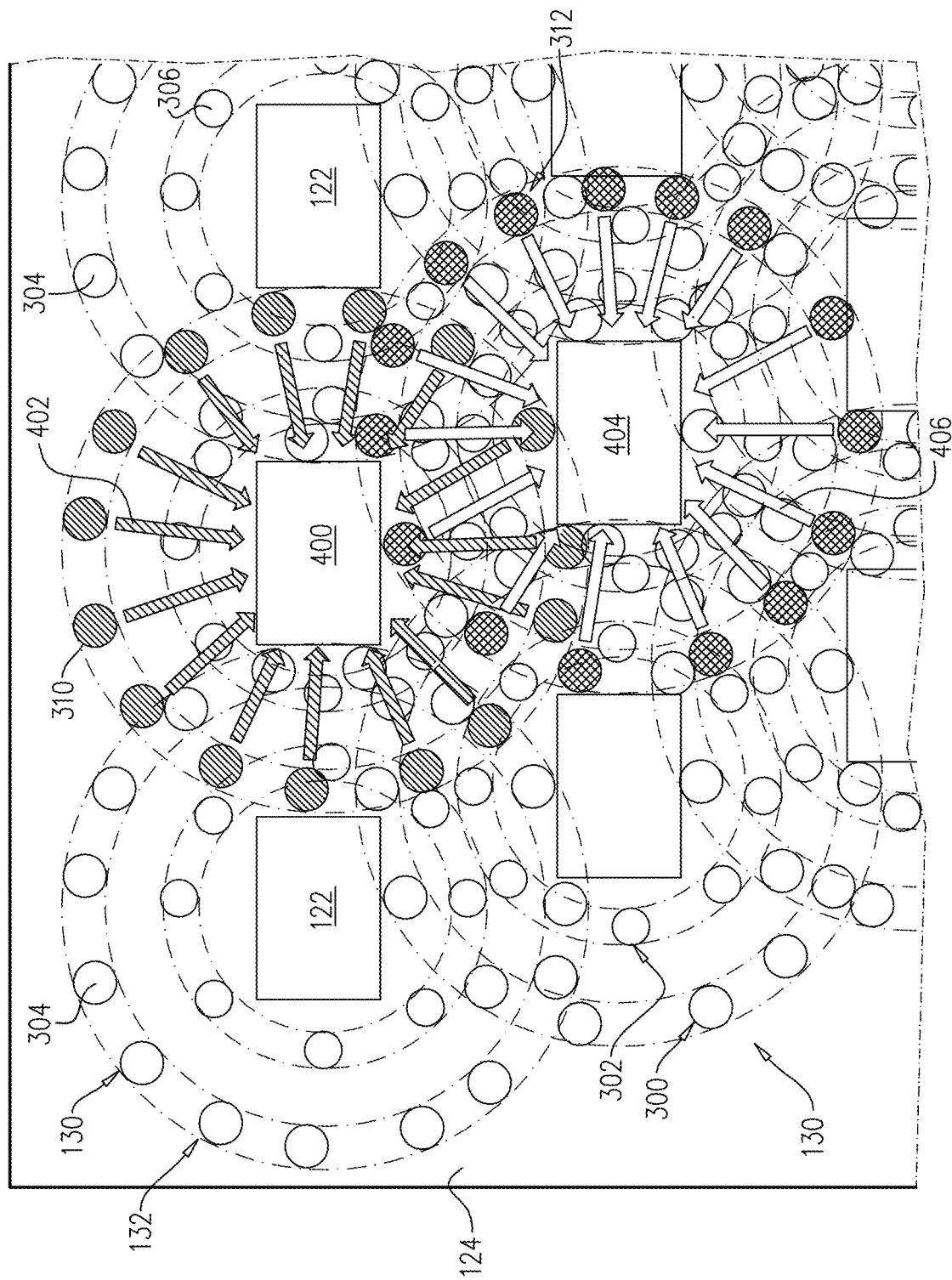
FIG. 4 is a simplified conceptual illustration of a projection of photon emitters onto a plane of fields of view of cameras in an image acquisition device of the type shown in FIGS. 1-2C.

The illumination of fields of view 122 by plurality of photon emitters 130 may be best understood with reference to FIG. 4, showing a simplified conceptual illustration of a projection of photon emitters onto a plane of fields of view 122 of plurality of cameras 120 in optical head 102. It is appreciated that for the sake of simplicity and clarity, beam shaping elements 150 are omitted from FIG. 4 and only photon emitters 130 are depicted in relation to fields of view 122.

As seen in FIG. 4, when second plurality of photon emitters 130 is projected onto plane 124 occupied by fields of view 122, plurality of photon emitters 130 circumferentially surrounds fields of view 122 and neighboring outer rings 300 of photon emitters 130, such as outer rings 300 formed by LEDs 310 and 312, mutually overlap.

By way of example, LEDs 310 of one of outer rings 300 direct light to a first field of view 400 surrounded thereby, as indicated by a first set of arrows 402. LEDs 312 of another one of outer rings 300 direct light to a second field of view 404 surrounded thereby, as indicated by a second set of arrows 406. Due to the overlap between neighboring rings 300 of LEDs 310 and 312, those of LEDs 310 lying within the boundary circumscribed by LEDs 312 are closer to second field of view 404 surrounded and illuminated by ring of LEDs 312, yet direct illumination to the more distant first field of view 400. Similarly, those of LEDs 312 lying within the boundary circumscribed by LEDs 310 are closer to the first field of view 400 surrounded and illuminated by ring of LEDs 310, yet direct illumination to the more distant second field of view 404.

It is appreciated that although the architecture and operation of photon emitters 130 with respect to fields of view 122 has been described hereinabove with respect to two particular individual fields of view 400 and 404, the description hereinabove is generally applicable to other photon emitters and fields of view constructed and operative in accordance with preferred embodiments of the present invention.

Figure 5A:
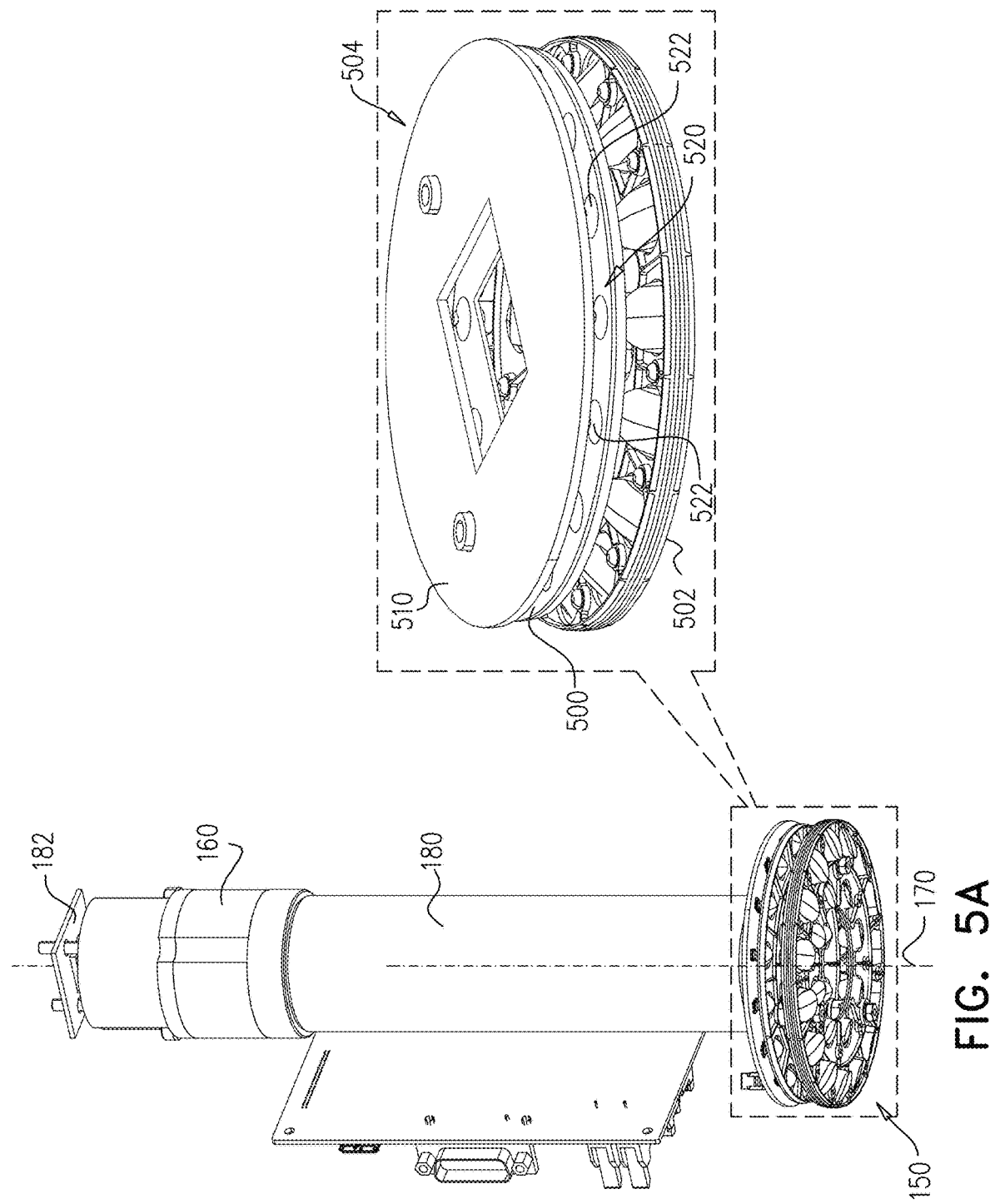
FIGS. 5A, 5B and 5C are simplified respective illustrations of an illumination assembly and components thereof, forming part of an image acquisition device of the type shown in FIGS. 1-4, constructed and operative in accordance with a preferred embodiment of the present invention.
Figure 5B:
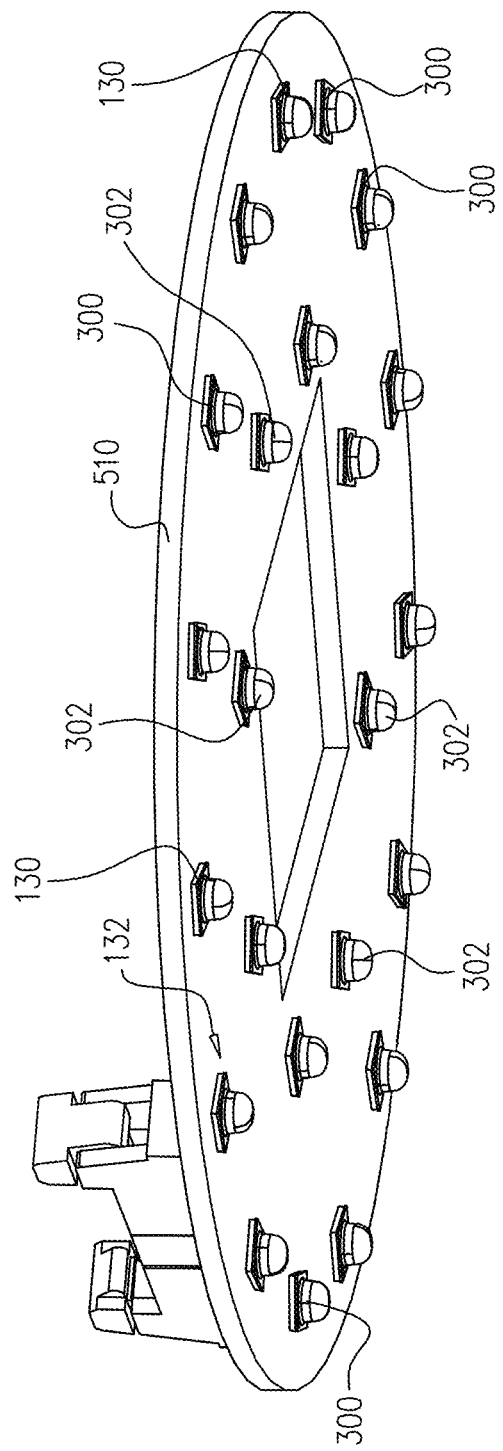
Figure 5C:
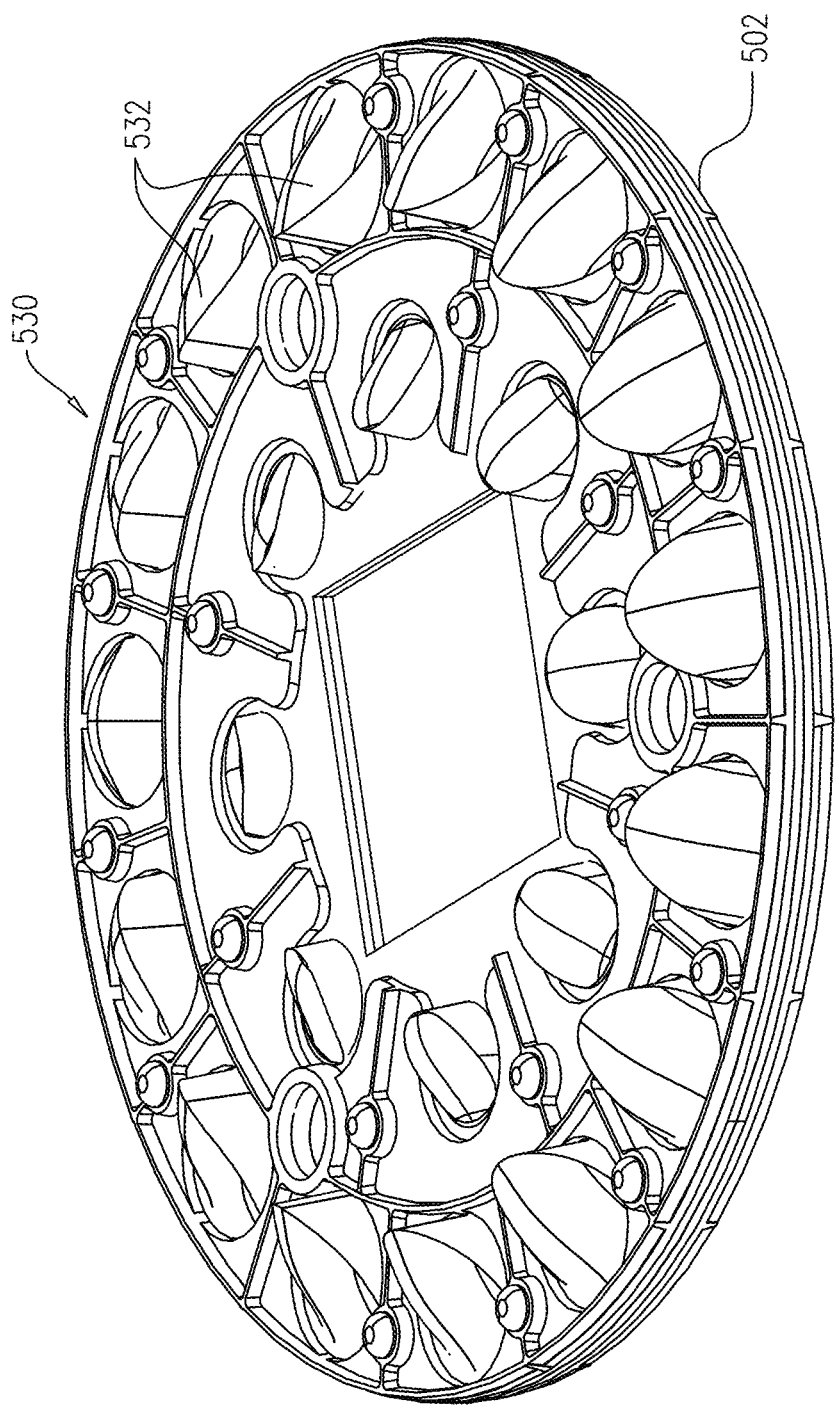

Reference is now made to FIGS. 5A, 5B and 5C, which are simplified respective illustrations of an illumination assembly and components thereof, forming part of an image acquisition device of the type shown in FIGS. 1-4, constructed and operative in accordance with a preferred embodiment of the present invention;

As seen in FIGS. 5A-5C, each circumferential arrangement 132 of plurality of photon emitters 130, here, by way of example, composed of outer ring 300 and inner ring 302 of LEDs, lies about camera axis 170 of camera 160. Here, by way of example, beam shaping optical elements 150 are shown to be housed by a collimator plate 500 and a deflector plate 502 stacked thereon. Each circumferential arrangement 132 of photon emitters 130, in combination with corresponding beam shaping optical elements 150 associated therewith, may be termed an illumination assembly 504.

It is appreciated that although a single annular illumination assembly 504 is illustrated in FIG. 5A, for the sake of simplicity and clarity of description, in actuality, multiple ones of illumination assembly 504 are preferably incorporated in optical head 102 in a multiplexed, mutually overlapping arrangement, as described hereinabove. Particularly preferably, illumination platform 140, collimator plate 500 and deflector plate 502 are formed as continuous, expansive elements having multiple, mutually overlapping arrangements of illumination assemblies 504 formed thereon, as illustrated in FIGS. 1-4.

Outer ring 300 and inner ring 302 of plurality of photon emitters 130 are preferably mounted on an LED mounting plate 510, as seen most clearly in FIG. 5B showing an enlarged view thereof. Mounting plate 510 preferably includes a plurality of capacitors (not shown) connected to electrical circuitry, for controlling operation of photon emitters 130. In a preferred operational mode, photon emitters 130 are driven by short pulses of electrical current. This allows image acquisition during continuous relative motion between the optical head 102 and the scanned target, while minimizing image blur. Capacitors and the circuitry associated therewith enabling such short pulse driving may be of the type described in Chinese Patent Application No. 201510828406.3, assigned to the same assignee as the present invention and incorporated herein by reference.

It is understood that mounting plate 510 preferably constitutes a segment of illumination platform 140. Thus, although mounting plate 510 is shown herein as holding only inner and outer rings 302, 300 of photon emitters thereon, a portion of illumination platform 140 corresponding to mounting plate 510 may in actuality also host additional photon emitters, which additional photon emitters are members of other rings of photon emitters, encroaching on outer ring 300 and optionally also on inner ring 302.

Collimator plate 500 is preferably located immediately beneath LED mounting plate 510 and preferably includes an array of light collimators 520, each light collimator 522 of array of light collimators 520 preferably cooperating with and being axially aligned with respect to a corresponding photon emitter on mounting plate 510. Here, by way of example, array of light collimators 520 comprises a dual-ring array, corresponding to inner and outer rings 302, 300 of photon emitters. It is understood, however, that collimators 522 may be arranged in any suitable configuration capable of providing the required collimation of light emitted by plurality of photon emitters 130. It is further understood that collimator plate 500 preferably constitutes a segment of a larger preferably planar sheet of light collimators, forming a part of collimator board 152.

Figure 6:
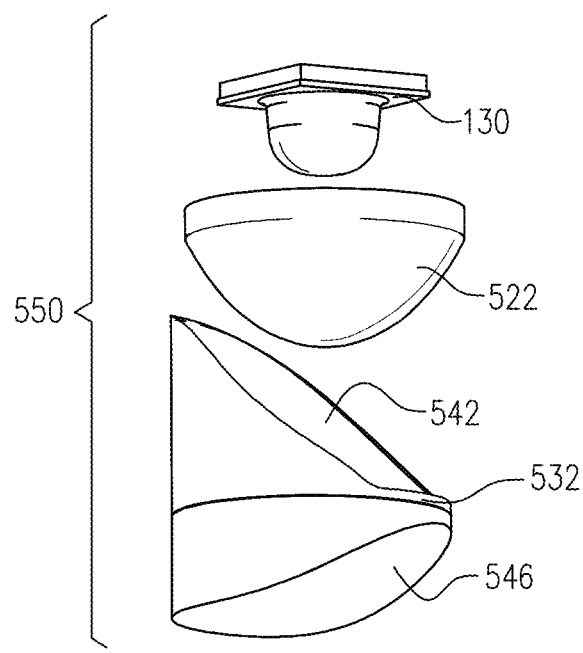
FIG. 6 is a simplified illustration of an optical illumination module of an illumination assembly of the type shown in FIGS. 5A-5C.

In accordance with the specific type of photon emitter employed, collimators 522 may comprise one or more of spherical, circularly symmetric aspherical, cylindrical or free-form lenses or reflectors including Fresnel counterparts of those optical elements. By way of example, collimators 522 illustrated in FIG. 6 are single-element aspheric lenses.

Deflector plate 502 is preferably located immediately beneath collimator plate 500 and preferably includes an array of light deflectors 530, as seen most clearly in FIG. 5C showing an enlarged view thereof. Each light deflector 532 of array of light deflectors 530 preferably cooperates with and is located longitudinally beneath a corresponding photon emitter 130 and collimator 522.

Each light deflector 532 preferably comprises one or more free-form optical elements. By way of example, as seen most clearly in FIGS. 5C and 6, light deflector 532 may be a prism having an irregularly chamfered entry facet 542 and exit facet 546. Persons skilled in the art will recognize that facets 542 and 546 collectively function in a manner resembling a free-form prism for deflecting light impinging thereon. Free-form facets 542 and 546 of the particular design shown in FIG. 6 additionally exhibit partial light collimation functionality, complementing the collimating function of aspheric collimators 522, in order to achieve improved illumination uniformity and efficiency at the respective field of view 122. The high deflection efficiency of deflector 532 in combination with collimator 522 preferably also minimizes the escape of stray light from each photon emitter to fields of view other than those intended to be illuminated by each given photon emitter. It is understood that deflector plate 502 preferably constitutes a segment of a larger planar sheet of light deflectors, forming a part of deflector board 154.

It is understood that collimator and deflector plates 500, 502 preferably each constitute only a segment of collimator and deflector boards 152, 154 respectively. Thus, although collimator and deflector plates 500, 502 are shown herein as holding only two rings of collimating and deflecting elements respectively thereon, a portion of collimator and deflector boards 152, 154 corresponding to collimator and deflector plates 500, 502 may in actuality also host additional collimator and deflector elements respectively, which additional collimator and deflector elements preferably correspond to and cooperate with photon emitters encroaching on rings of photon emitters on a corresponding portion of illumination platform 140.

Figure 7:
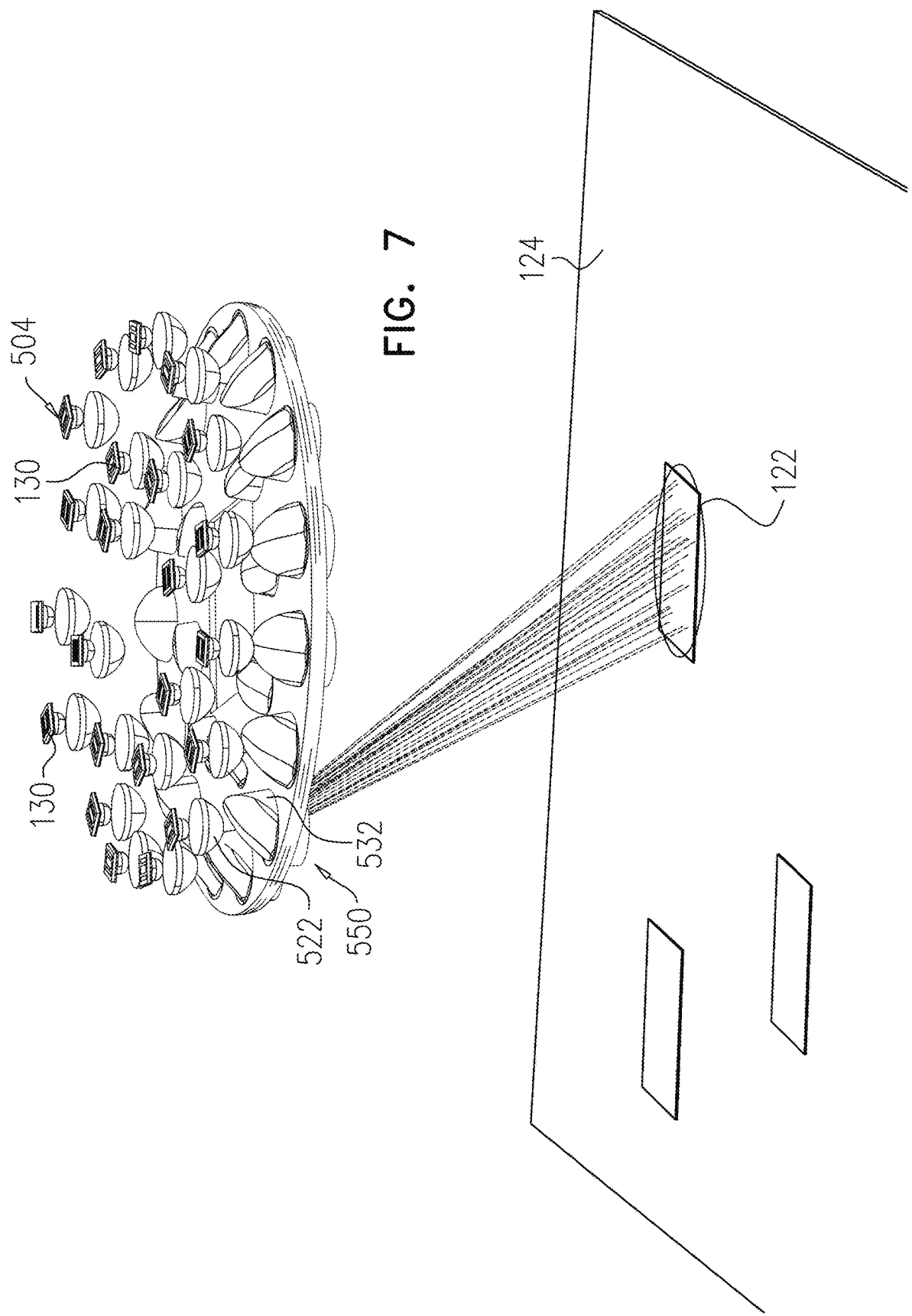
FIG. 7 is a simplified illustration of light output from an optical illumination module of the type shown in FIG. 6.

LED mounting plate 510 is preferably fabricated as a printed circuit board (PCB) on which are additionally preferably mounted some or all of the LED driving electronic circuitry. Alternatively, LED mounting plate 510 as well as collimator plate 500 and deflector plate 502, including the various optical elements housed thereby, may be manufactured by three-dimensional printing techniques (e.g. by Luximprint V.O.F of the Netherlands). Other known manufacturing techniques that may be employed for producing collimator elements 522 and deflecting elements 532 include injection molded plastic, Computer Numerical Control (CNC) machining and glass molding. It is appreciated that illumination assemblies 504 thus are constructed of generally planar, readily manufacturable elements, which may be produced at low cost and be easily assembled Each vertical stack of photon emitter 130, collimator 522 and light deflector 532 may be collectively termed an illumination module 550. An exemplary illumination module 550 is illustrated in FIG. 6, light output from which illumination module 550 is shown in a highly simplified manner in FIG. 7. As appreciated from consideration of FIGS. 6 and 7, illumination module 550 preferably directs collimated light emitted by the photon emitter, such as an LED, forming a part thereof towards the associated field of view 122. Preferably, collimators 522 and deflectors 532 are functional to direct light from photon emitter 130 in a manner such that each illumination module 550 illuminates the entirety of a single field of view 122, as seen in FIG. 7.

It is understood that the inclusion of deflectors 532 in illumination module 550 and illumination assembly 504 in order to direct collimated light from collimators 522 towards fields of view 122 is exemplary only and that deflectors 532 may be replaced by other light directing mechanisms. By way of example, deflectors 532 may be obviated and light angled towards fields of view 122 by other mechanisms as are known in the art. These mechanisms include but are not limited to planar refractive beam deflectors and diffraction gratings, the latter being particularly effective in combination with laser type photon emitters.

It is appreciated that, in some embodiments of the present invention, it may be advantageous for at least one illumination module of at least one illumination assembly 504 to illuminate more than one field of view 122, rather than only a single field of view as illustrated in the case of illumination module 550.

The illumination of more than one field of view by an illumination module of the present invention may be desirable since, due to the highly dense arrangement of photon emitters 130, individual photon emitters 130 respectively belonging to neighboring circumferential arrangements 132 may be designated to be located at physically intersecting locations on illumination platform 140. As only one photon emitter may occupy a given location on illumination platform 140, this creates a region of conflict between two or more photon emitters 130 competing to occupy at least part of the same region on illumination platform 140.

A conflict may arise between two or more photon emitters 130 of neighboring inner rings 302, between two or more photon emitters 130 of neighboring outer rings 300, or between two or more photon emitters 130 of neighboring inner and outer rings 302 and 300.

Such a conflict may be resolved by shifting the location of one or more of the photon emitters 130 competing to occupy the same position. However, this solution may not be viable in the case that the at least one competing photon emitter requires shifting to an unacceptably distant position from the circumferential arrangement 132 to which the photon emitter belongs, preventing the at least one photon emitter 130 from providing the required illumination to the associated field of view 122.

Such a conflict may alternatively be resolved, in accordance with one preferred embodiment of the present invention, by placing a single photon emitter 130 at the position of conflict on illumination platform 140, the single photon emitter 130 forming part of a light-splitting illumination module directing light towards more than one field of view 122. The single photon emitter 130 occupying the position of conflict effectively replaces the multiple photon emitters that were designated to occupy that position, by outputting light towards the fields of view that were designated to be illuminated by additional photon emitters occupying that position. The single photon emitter 130 occupying the position of conflict thus directs light to at least one other field of view in addition to the field of view illuminated by the generally circumferential arrangement 132 to which the photon emitter belongs.

The illumination of more than one field of view by an illumination module of the present invention may be advantageous even if the above-described conflict is not present, in order to reduce the number of illumination modules and hence the number of photon emitters required on illumination platform 140. This may reduce manufacturing costs, power dissipation and complexity in certain embodiments of the present invention.

Illumination module 550 may be modified so as to illuminate more than one field of view, by replacement of single deflecting element 532 by a plurality of deflecting elements. By way of example, deflecting element 532 may be replaced by a plurality of prisms having a number and orientation of facets corresponding to the number and orientation of required light output beams.

Various examples of illumination modules of the present invention configured to direct light towards more than one field of view, and the corresponding light outputs therefrom, are illustrated in a highly simplified form in FIGS. 8-12.

Figure 8:
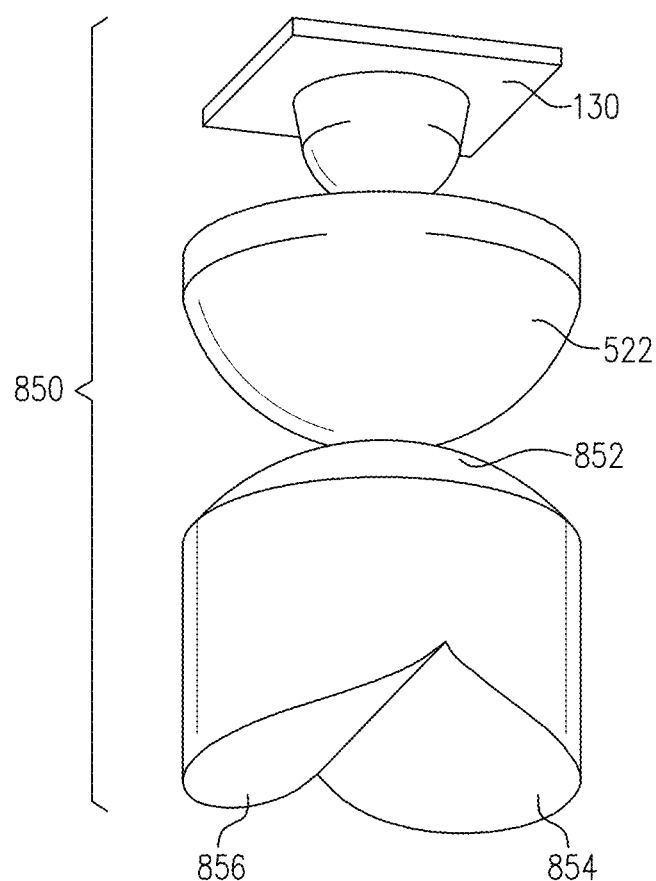
FIG. 8 is a simplified illustration of an optical illumination module of an illumination assembly constructed and operative in accordance with another preferred embodiment of the present invention.
Figure 9:
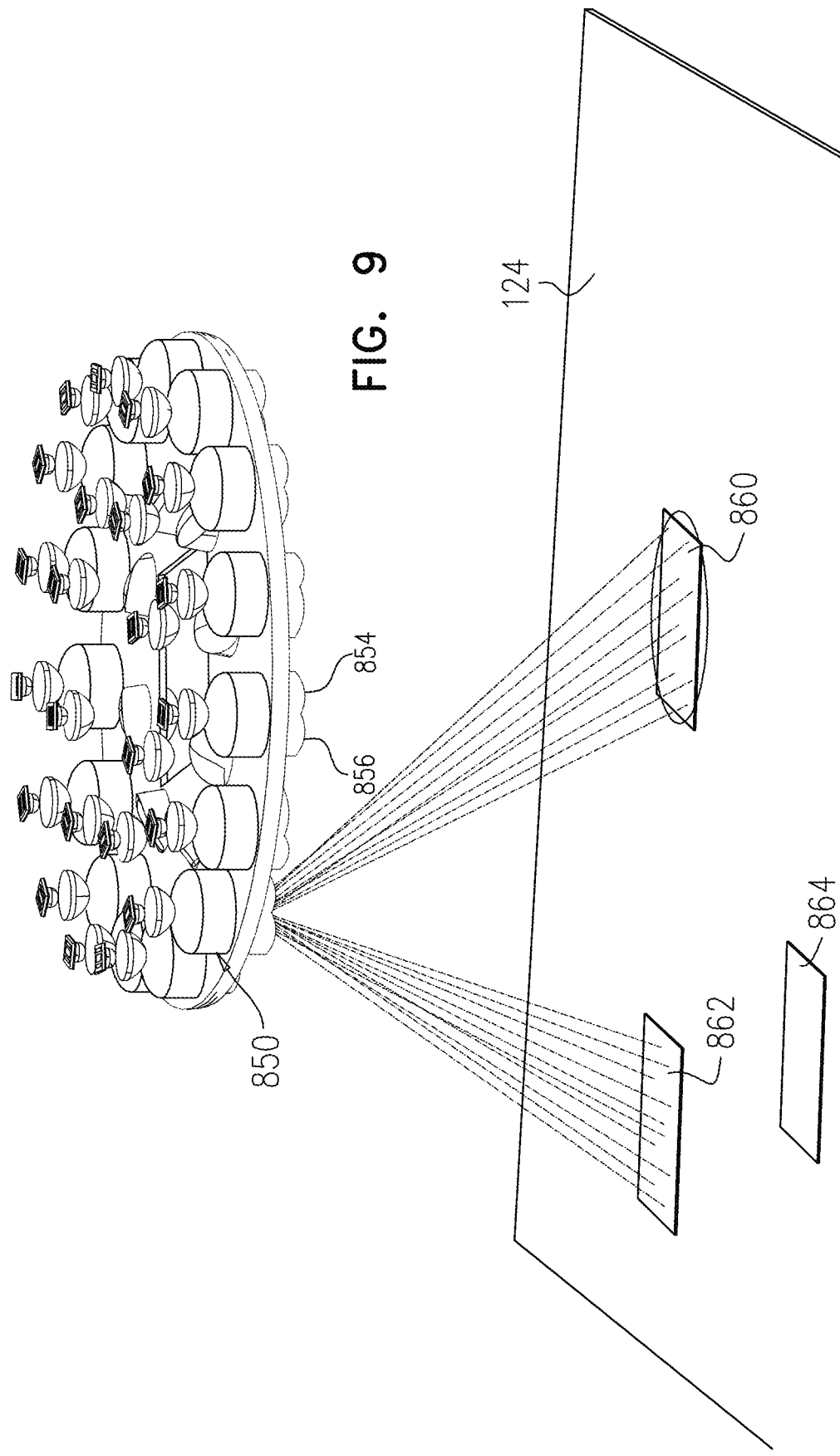
FIG. 9 is a simplified illustration of light output from an optical illumination module of the type shown in FIG. 8.

Turning now to FIG. 8, an illumination module 850 preferably includes photon emitter 130, a collimating element such as collimator 522 and a deflecting element 852. It is appreciated that the collimating element included in illumination module 850 is not necessarily of the same structure as collimator 522 and may be optimized in accordance with the desired performance characteristics of illumination module 850. Deflecting element 852 is preferably embodied as a split prism having a first output facet 854 and a second output facet 856. First and second output facets 854, 856 are preferably of mutually different orientations, and are preferably each oriented so as to direct light to a different field of view. For example, as seen in FIG. 9, first output facet 854 may project an output beam towards a first field of view 860 and second output facet 856 may project an output beam towards a second field of view 862. A third field of view 864 is preferably not illuminated by illumination module 850.

Output facets 854 and 856 of deflector element 852 are illustrated as comprising concave surfaces in FIGS. 8 and 9. It is understood, however, that these facets may alternatively be formed as convex, outward pointing or protruding surfaces rather than inward pointing or recessed surfaces.

It is understood that illumination module 850 thus effectively at least partially replaces the functionality of two individual illumination modules 550 that would have illuminated first and second fields of view 860 and 862 respectively.

Figure 10:
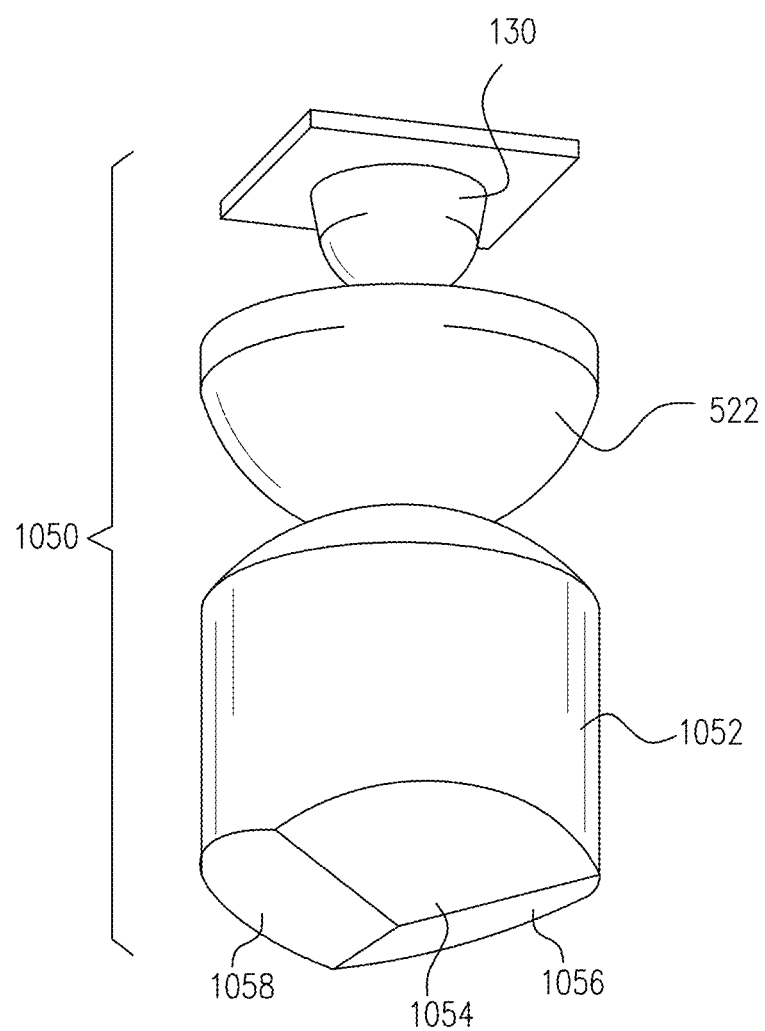
FIG. 10 is a simplified illustration of an optical illumination module of an illumination assembly constructed and operative in accordance with yet another preferred embodiment of the present invention.
Figure 11:
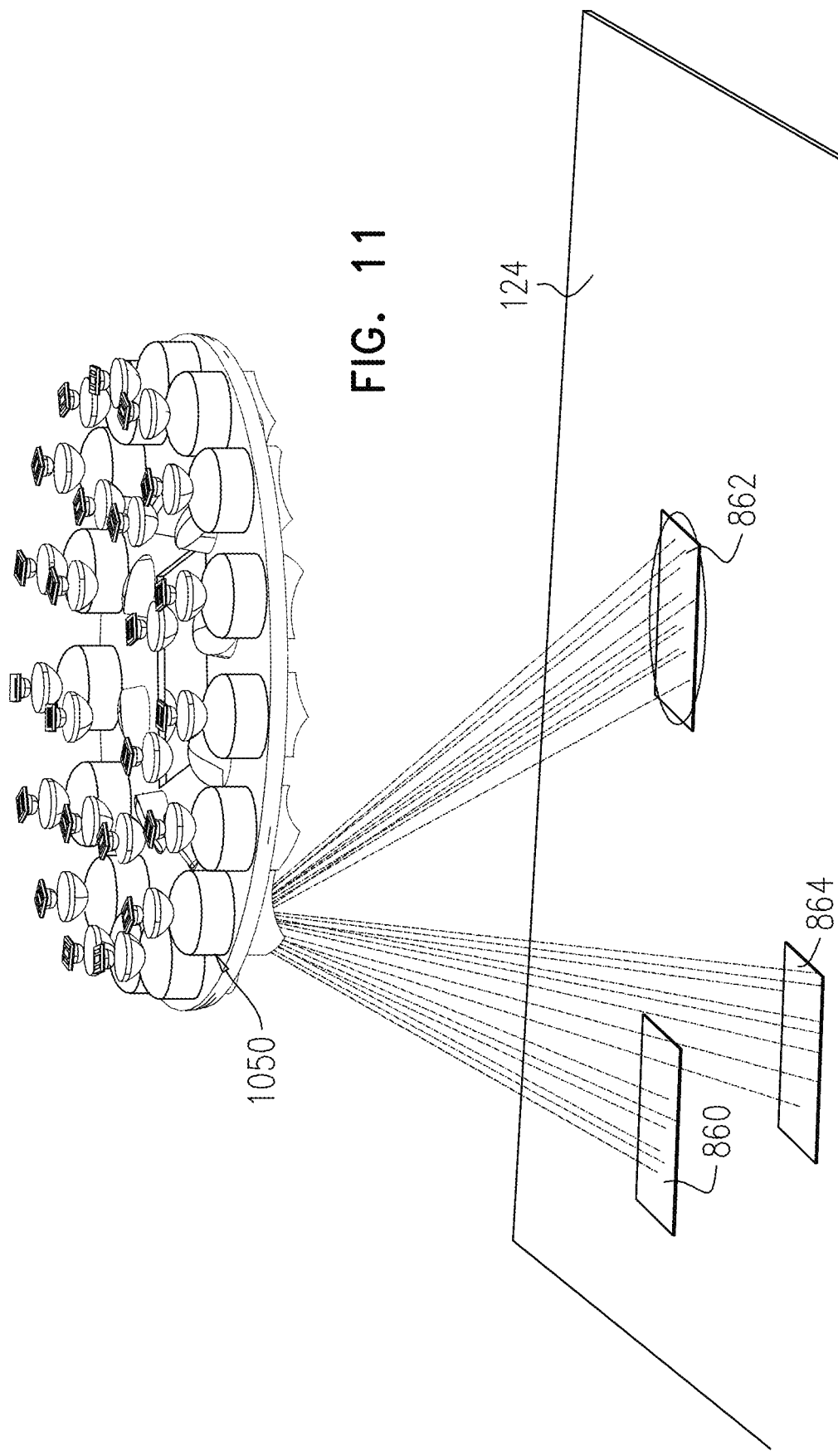
FIG. 11 is a simplified illustration of light output from an optical illumination module of the type shown in FIG. 10.

Turning now to FIG. 10, an illumination module 1050 preferably includes photon emitter 130, a collimator element such as collimator 522 and a deflecting element 1052. Deflecting element 1052 is preferably embodied as a split prim having first, second and third output facets 1054, 1056 and 1058. First-third output facets 1054-1058 are preferably each orientated so as to direct light to a different field of view. Output facets 1054-1058 are illustrated as convex surfaces in FIG. 10. It is understood, however, that these facets may also be designed as concave surfaces, as illustrated in FIG. 11. For example, as seen in FIG. 11, first output facet 1054 may direct light to first field of view 860, second output facet 1056 may direct light to second field of view 862 and third output facet 1058 may direct light to third field of view 864.

It is understood that illumination module 1050 thus effectively at least partially replaces the functionality of three individual illumination modules 550 that would have illuminated first, second and third fields of view 860, 862 and 864, respectively.

It will be appreciated by persons skilled in the art that the split illumination modules such as illumination modules 850 and 1050 differ somewhat in performance in comparison to a non-split illumination module, such as illumination module 550. This is because each split illumination module only projects light from a portion of the exit aperture thereof, with respect to each field of view. Additionally, the light power of the split illumination module is distributed over more than one field of view, resulting in the delivery of less light power to each individual field of view illuminated thereby.

In the case of substantially diffusely reflecting substrates loss of light power tends to be the more significant of these effects. The relative loss of light power may be compensated for by providing a physically larger and/or higher power photon emitter 130 within the split illumination module. Additionally or alternatively, the relative power loss may be compensated for by equalizing the illumination of each field of view by providing additional illumination from other light-splitting illumination modules.

In the case of at least partially specularly reflecting substrates, the angle subtended by the illumination module may also be significant. In such cases, a split illumination module of the type illustrated in FIG. 12 may be advantageous, in order to preserve the angular extent of the illumination.

Figure 12:
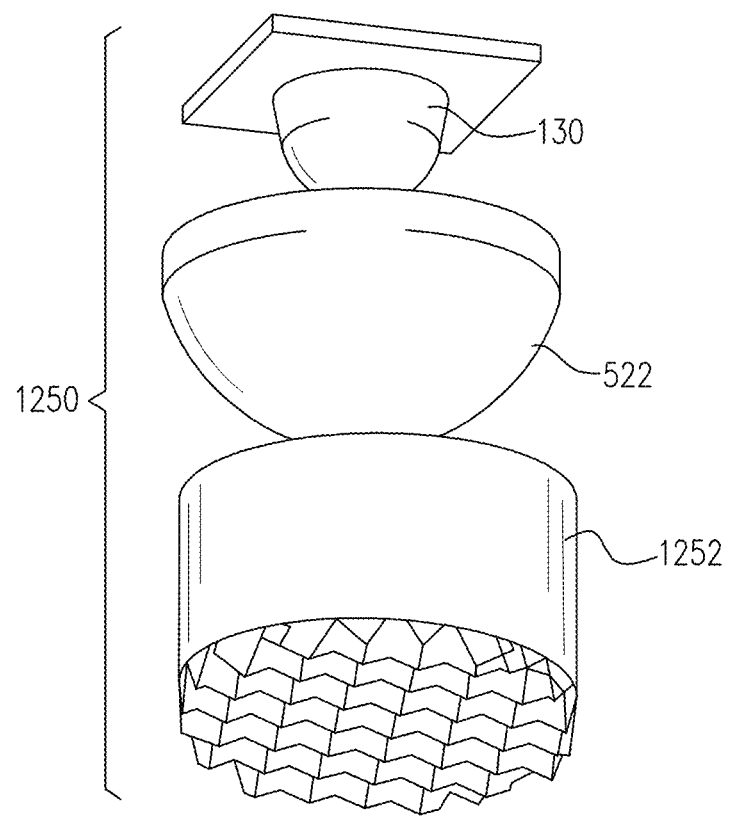
FIG. 12 is a simplified illustration of an optical illumination module of an illumination assembly constructed and operative in accordance with still another preferred embodiment of the present invention.

Turning now to FIG. 12, an illumination module 1250 preferably includes photon emitter 130, a collimating element such as collimator 522 and a deflecting element 1252. Deflecting element 1252 is preferably embodied as multifaceted, convex or concave, prism, directing light to multiple fields of view. The multi-prism design of deflecting element 1252 serves to evenly distribute illumination across the exit facet thereof as a multitude of small illumination gaps, which illumination gaps are scrambled by the substrate reflection properties and imaging lens acceptance angle.

It is understood that a given illumination assembly may include any combination of illumination modules of the present invention, including illumination modules illuminating only a single field of view and light-splitting illumination modules illuminating multiple fields of view, depending on the requirements of the optical inspection system in which the illumination assembly is incorporated.

Figure 13:
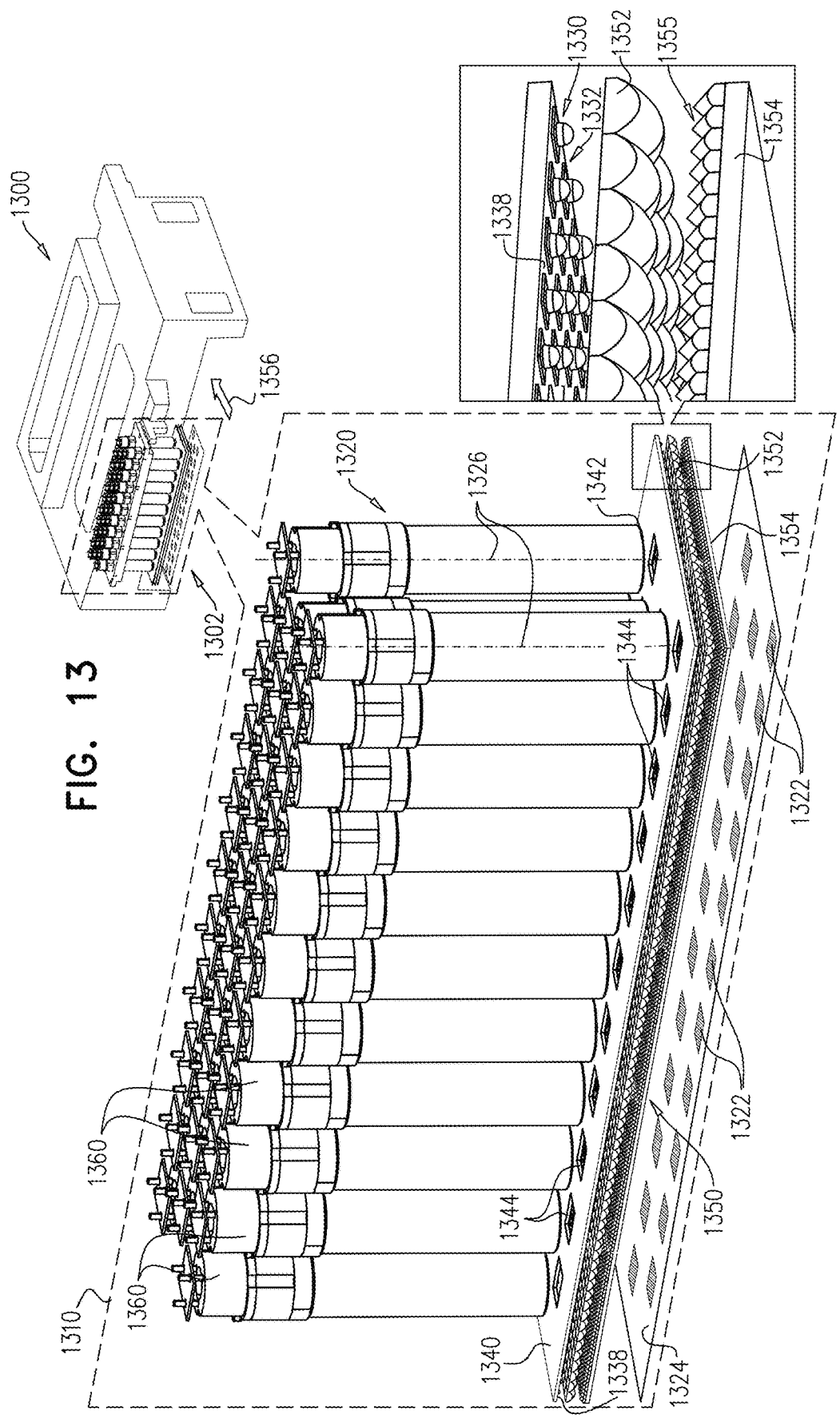
FIG. 13 is a simplified illustration of an optical system including an image acquisition device forming a part thereof, constructed and operative in accordance with another preferred embodiment of the present invention.

Reference is now made to FIG. 13, which is a simplified illustration of an optical system including an image acquisition device forming a part thereof, constructed and operative in accordance with another preferred embodiment of the present invention.

As seen in FIG. 13, there is provided an optical system 1300 including an image acquisition device 1302. Optical system 1300 may be any type of system employing optical elements and benefitting from the inclusion of an image acquisition device therein, such as, by way of example only, an optical scanning system, optical inspection system, optical processing system or optical manufacturing system. Here, by way of example, optical system 1300 is shown to be embodied in a form typical of an optical scanning system and image acquisition device 1302 to be mounted thereon. It is appreciated, however, that this representation of optical system 1300 and the location of image acquisition device 1302 therein is illustrative only and may readily be varied in accordance with the design requirements of optical system 1300.

Image acquisition device 1302 preferably includes optical elements operative to illuminate a substrate handled by optical system 1300 and to subsequently acquire an image thereof. Image acquisition device 1302 may therefore be termed an optical head 1302. As seen most clearly at an enlargement 1310 showing an enlarged view of optical head 1302, optical head 1302 preferably includes a first plurality of cameras 1320 arranged in a mutually spaced configuration, each camera having an associated field of view 1322, each field of view 1322 lying in a plane such as a plane 1324. Plane 1324 preferably coincides with a surface of the substrate to be imaged, such that fields of view 1322 of cameras 1320 lie on the substrate surface. In the case of a planar target, plane 1324 occupied by the fields of view 1322 may be a common plane, within which plane 1324 all of fields of view 1322 of cameras 1320 lie. Alternatively, in the case of a non-planar substrate to be imaged, fields of view 1322 of cameras 1320 may lie in more than one plane.

Optical head 1302 further preferably includes a second plurality of photon emitters 1330 arranged in a multiplicity of arrangements 1332 about each camera of first plurality of cameras 1320, which photon emitters 1330 preferably illuminate fields of view 1322. Particularly preferably, multiplicity of arrangements 1332 of photon emitters 1330 are arranged about an axis 1326 of each camera of first plurality of cameras 1320.

It is a particular feature of a preferred embodiment of the present invention that at least one photon emitter in at least one of arrangements 1332 directs light to a field of view 1322 of one of the first plurality of cameras 1320 which is not the closest field of view to that photon emitter. Such an arrangement of plurality of photon emitters 1330 with respect to plurality of cameras 1320 allows plurality of photon emitters 1330 to provide wide-angle generally uniform illumination of fields of view 1322 in a highly compact form factor, as is explained in greater detail henceforth.

Second plurality of photon emitters 1330 is preferably mounted on an underside 1338 of an illumination platform 1340. Illumination platform 1340 is preferably located beneath entrance facets 1342 of lenses of cameras 1320, interfacing cameras 1320 and fields of view 1322, with underside 1338 of illumination platform 1340 distal from entrance facets 1342. A multiplicity of apertures 1344 is preferably formed in illumination platform 1340, wherethrough light emanating from illuminated fields of view 1322 arrives at cameras 1320. Second plurality of photon emitters 1330 is preferably arranged with respect to apertures 1344 in a non-overlapping configuration, so as to illuminate fields of view 1322 without obscuring light emanating therefrom. In certain embodiments photon emitters 1330 may be distributed over the entire area of illumination platform 1340 so as to maximize the illumination intensity and uniformity whilst retaining a compact form factor.

Light emitted by plurality of photon emitters 1330 may be directed towards fields of view 1322 in the manner described above by means of various beam shaping optical elements 1350, which optical elements 1350 may have collimating and/or deflecting functionalities. Such optical elements 1350 may be mounted on one or more boards, such as a collimator board 1352 upon which are preferably mounted collimating elements and a deflector board 1354 upon which are preferably mounted deflecting elements. Collimator board 1352 and deflector board 1354 are shown in FIG. 13 to be located adjacent to each other and to illumination platform 1340. It is appreciated that collimator and deflector boards 1352, 1354 may be provided separate from illumination platform 1340 or may be integrally formed therewith, such that plurality of photon emitters 1330 and beam shaping optical elements 1350 occupy a monolithic, multi-tiered platform.

It is a particular feature of a preferred embodiment of the present invention illustrated in FIG. 13 that deflector board 1354 is embodied as an array of a third plurality of axicons 1355 having light deflecting functionality. Array of axicons 1355 is preferably formed as a tightly packed array of conical optical elements, typically comprising plastic or glass. As is well known in the art, axicons 1355 deflect light substantially equally in all directions relative the vertical direction along which light is incident thereon, such that no light is transmitted along the vertical axis and a ring of deflected light is generated. In the embodiment of the present invention shown in FIG. 13, axicons 1355 receive light from second plurality of photon emitters 1330, by way of collimating elements on collimator board 1352, and in turn generate rings of light illuminating fields of view 1322. The collective effect of the tightly packed array of axicons 1355 is thus to project a ring-shaped radiance distributed with respect to the fields of view 1322. A virtual ring illumination is thereby created with respect to each field of view 1322, without requiring a physical circumferential arrangement of light sources. Further details concerning the preferable structure and function of the illuminator assemblies formed by photon emitters 1330 in conjunction with array of axicons 1355 and additional beam shaping optical elements 1350 are provided henceforth, with reference to FIGS. 15A-17.

First plurality of cameras 1320 is preferably organized in a staggered array, comprising a series of generally parallel mutually offset rows forming a series of staggered columns. During scanning of a substrate by optical head 1302, the substrate and optical head 1302 are preferably in relative motion along a scan direction generally indicated by an arrow 1356. Such motion may be by way of movement of the substrate in scan direction 1356 as optical head 1302 remains stationary, by way of movement of optical head 1302 in scan direction 1356 as the substrate remains stationary or by way of movement of both optical head 1302 and the substrate.

As appreciated from consideration of FIG. 13, the scan direction 1356 is preferably generally perpendicular to the direction of the rows of cameras 1320, such that the direction of the rows defines a cross-scan direction. Cameras 1320 are preferably mutually spaced apart in both a scan and cross-scan direction so as to allow single-pass scanning of a substrate, when the substrate and optical head 1302 are in relative motion along scan direction 1356.

Here, by way of example, first plurality of cameras 1320 is seen to comprise 32 individual cameras 1360 arranged in three staggered rows and capable of providing single-pass scanning of a target. It is appreciated, however, that first plurality of cameras 1320 may comprise a greater or fewer number of individual cameras 1360 arranged in a variety of array architectures, depending on the imaging requirements of optical system 1300. In particular, a fewer number of cameras 1320 than that illustrated may be employed, such that single-pass scanning of the entire substrate is not enabled. In such a case, movement along scan direction 1356 may be complemented by a stepwise movement in the cross-scan direction, perpendicular to scan direction 1356.

Figure 14A:
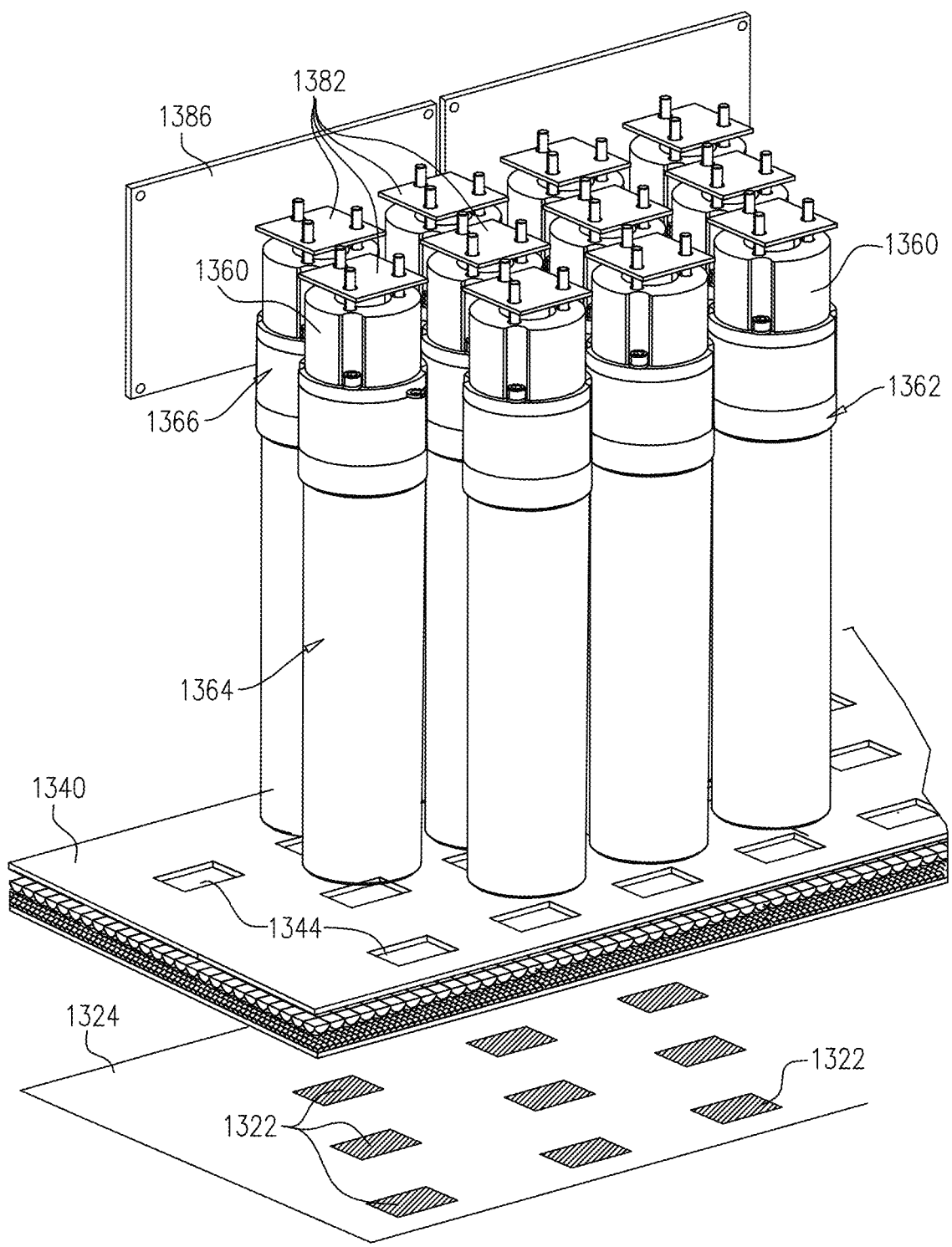
Figure 14B:
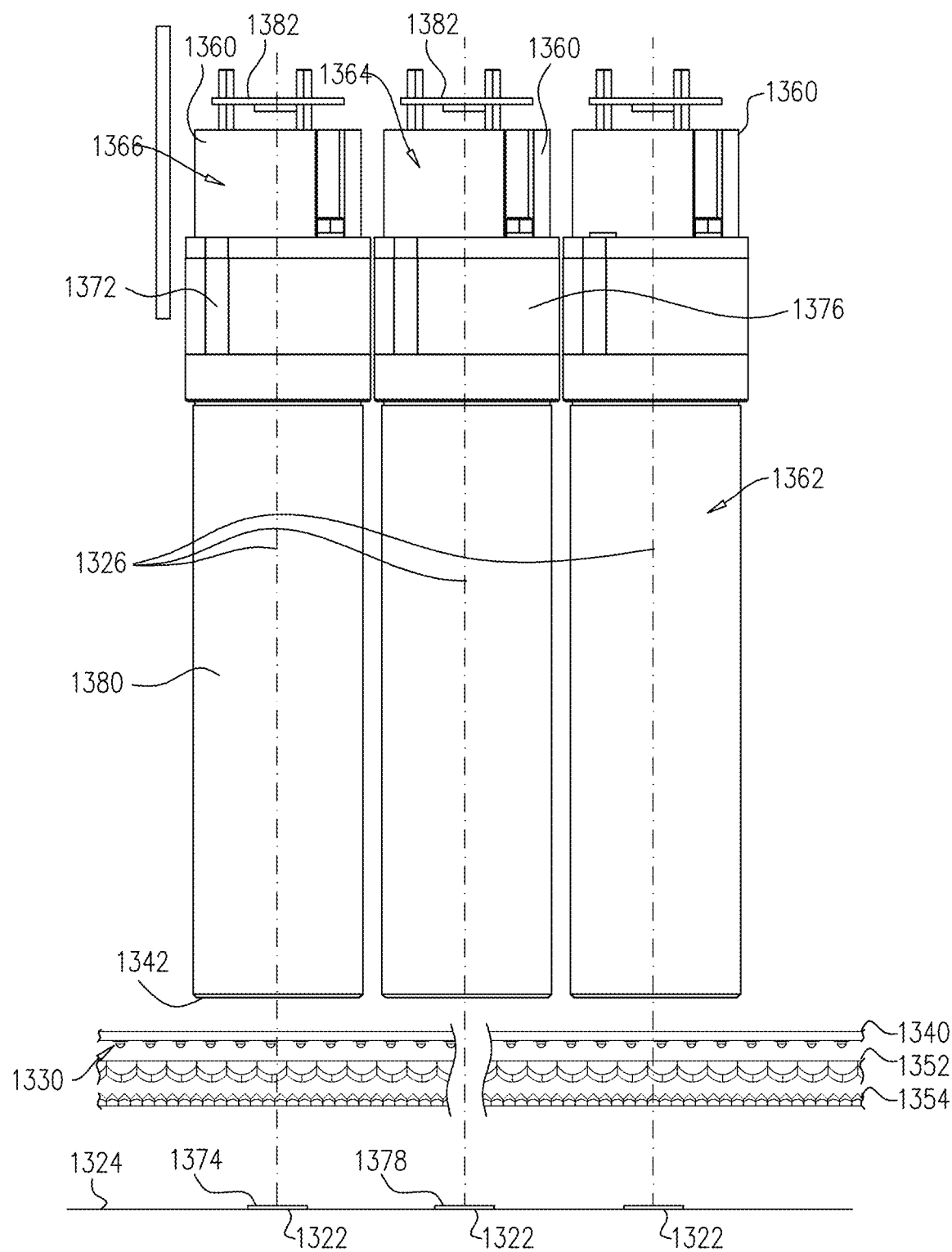

The arrangement and structure of plurality of cameras 1320 may be best understood with reference to FIGS. 14A-14C, showing a representative portion of first plurality of cameras 1320. As seen in FIGS. 14A-14C, first plurality of cameras 1320 is preferably distributed over a first 1362 a second 1364 and a third 1366 row in a partially overlapping arrangement as viewed in scan direction 1356. As best appreciated from consideration of FIG. 14C, such a staggered, partially overlapping arrangement of cameras provides a continuous lateral field of view 1368 as viewed in scan direction 1356, thereby allowing single-pass scanning of a target. By way of example, the 32 camera arrangement shown herein may provide single-pass scanning of a substrate having a width of approximately 600 mm in a cross-scan direction.

As seen most clearly in FIGS. 14B and 14C, each camera 1360 defines camera axis 1326 and the field of view 1322 of each camera 1360 is that field of view lying directly beneath the camera 1360 and intersected by the camera axis 1326. Thus, by way of example, a first camera 1372 has a first corresponding field of view 1374, a second camera 1376 has a second corresponding field of view 1378 and so forth, as seen in FIG. 14B. Arrangements 1332 of second plurality of photon emitters 1330 are preferably generally centered about and intersected by camera axis 1326 of each camera 1360.

Each camera 1360 preferably comprises a lens portion 1380 and an associated camera board 1382 connected thereto. Camera board 1382 may be a printed circuit board (PCB) hosting an integrated-circuit sensor chip and electronics for camera driving and control. Camera boards 1382 may be formed individually or, for manufacturing convenience, may be formed as a common element. The operation of plurality of cameras 1320 may be additionally controlled by electronic circuitry formed on a set of control boards 1386. By way of example, a group of eight individual cameras 1360 may be connected to and controlled by a single control board 1386 located posterior to the cameras 1360. Control boards 1386 may also house electronics for the control and driving of plurality of photon emitters 1330. Control boards 1386 may be cooperatively coupled to camera boards 1382 so as to coordinate the operation of first plurality of cameras 1320 and second plurality of photon emitters 1330.

Lens portion 1380 is particularly preferably embodied as a telecentric lens. A telecentric lens suitable for use in cameras 1360 may be of the type commercially available from Schneider Optics of Bad Kreuznach, Germany; Edmund Optics of New Jersey, US; NET New Electronic Technology GMBH of Finning, Germany; and Opto-Engineering of Mantua, Italy.

As is known in the art, in telecentric lenses the image of the field of view is formed by light rays propagating substantially parallel to the lens axis 1326, due to the manner in which light is captured by the telecentric lens. It is therefore understood by one skilled in the art that it is the telecentric nature of lens portions 1380 in combination with the generally rectangular shape of the light sensitive region of the image sensor of camera board 1382 that give rise to the generally rectangularly shaped of fields of view 1322 and the corresponding rectangularly shaped apertures 1344 shown herein. It is appreciated, however, that lenses of types other than telecentric lenses may be incorporated in the first plurality of cameras 1320 of the present invention, in which case modifications may be made as required in order to accommodate the shapes of the fields of view associated therewith.

As best appreciated from consideration of FIG. 14B, a width of fields of view 1322 is considerably smaller than a diameter of the corresponding camera lens 1380, in keeping with the telecentric nature of camera lens 1380. It is a particularly advantageous feature of the present invention that first plurality of cameras 1320 is capable of providing single-pass scanning of a substrate despite the camera fields of view being considerably smaller than the camera lens diameter. By way of example, in the optical head 1302 of the present invention, single pass scanning may be achieved despite fields of view 1322 having a width of the order of approximately 20 mm less than a diameter of corresponding lenses 1380.

This is in contrast to conventional single-pass optical imaging systems, in which single-pass scanning is typically enabled by the use of cameras having fields of view at least as large as the camera lens itself.

Figure 15A:
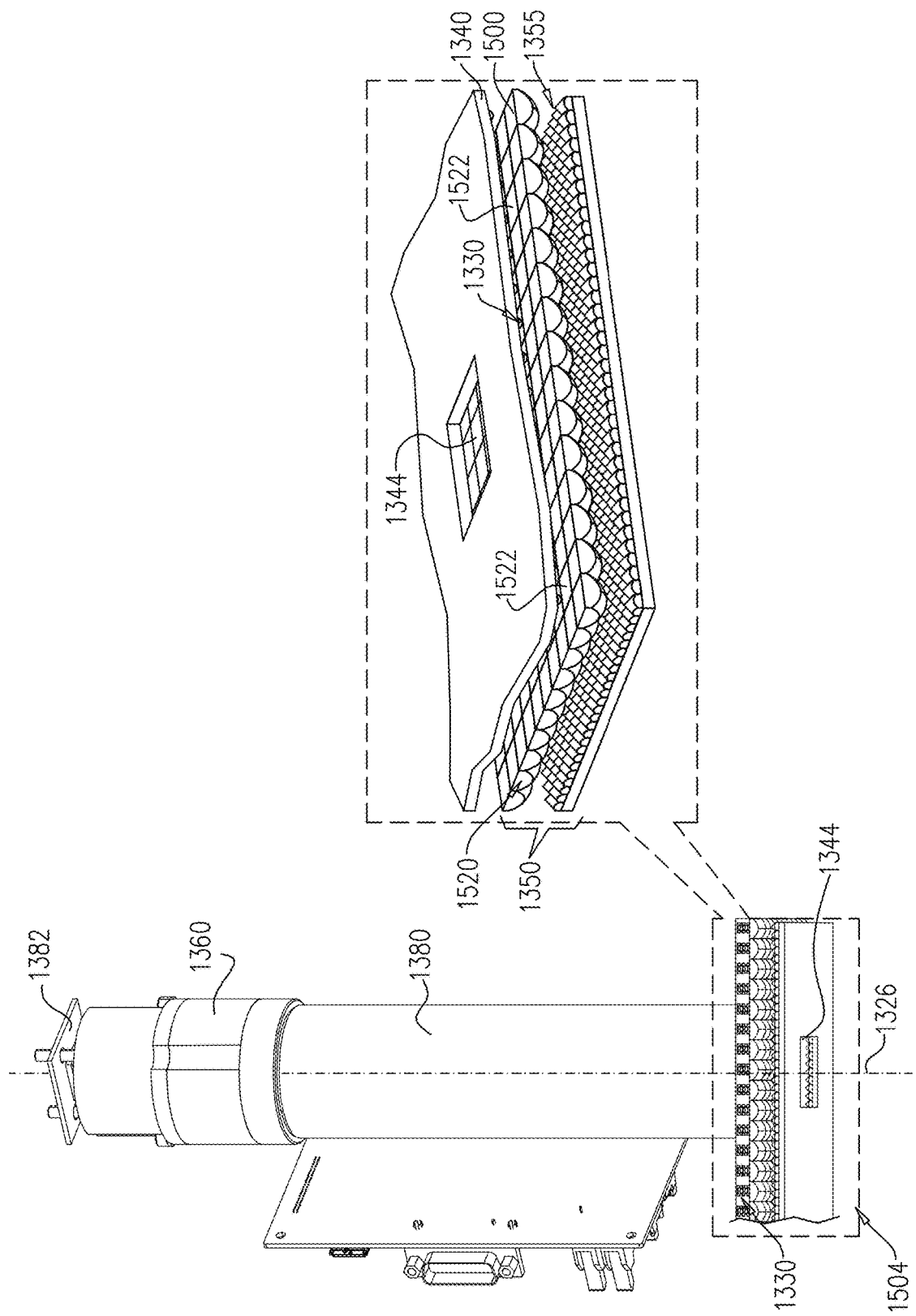
Figure 15B:
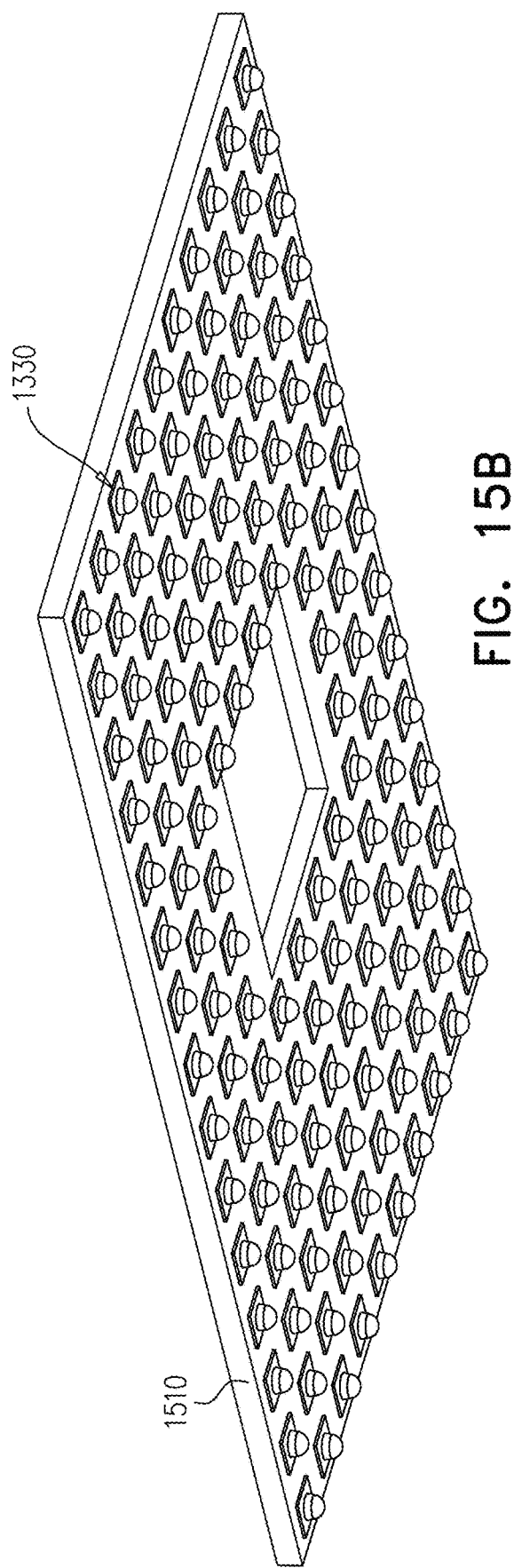

Reference is now made to FIGS. 15A, 15B and 15C, which are simplified respective illustrations of an illumination assembly and components thereof, forming part of an image acquisition device of the type shown in FIGS. 13-14C, constructed and operative in accordance with a preferred embodiment of the present invention;

As seen in FIGS. 15A-15C, plurality of photon emitters 1330 on a portion of illumination platform 1340 preferably surround camera axis 1326 of camera 1360. A collimator plate 1500 is preferably positioned beneath photon emitters 1330 and array of axicons 1355 preferably located therebeneath. Photon emitters 1330 surrounding camera 1360, in combination with corresponding beam shaping optical elements 1350 associated therewith including axicons 1355, may be termed an illumination assembly 1504.

It is appreciated that although a single illumination assembly 1504 is illustrated in FIG. 15A, for the sake of simplicity and clarity of description, in actuality, multiple ones of illumination assembly 1504 are preferably incorporated in optical head 1302 in a multiplexed, mutually overlapping arrangement, as described hereinabove. Particularly preferably, illumination platform 1340, collimator plate 1500 and axicon array 1355 are preferably formed as continuous, expansive elements having multiple, mutually overlapping arrangements of illumination assemblies 1504 formed thereon, as illustrated in FIGS. 13-14C.

Photon emitters 1330 are preferably mounted on an LED mounting plate 1510, as seen most clearly in FIG. 15B showing an enlarged view thereof. Mounting plate 1510 preferably includes a plurality of capacitors (not shown) connected to electrical circuitry, for controlling operation of photon emitters 1330. In a preferred operational mode, photon emitters 1330 are driven by short pulses of electrical current. This allows image acquisition during continuous relative motion between the optical head 1302 and the scanned target, while minimizing image blur. Capacitors and the circuitry associated therewith enabling such short pulse driving may be of the type described in Chinese Patent Application No. 201510828406.3, assigned to the same assignee as the present invention and incorporated herein by reference.

It is understood that mounting plate 1510 preferably constitutes a segment of illumination platform 1340. It is understood that the particular geometric arrangement of photon emitters 1330 on mounting plate 1510 illustrated in FIG. 15B is exemplary only, and that photon emitters 1330 may be arranged in any suitable repeating or non-repeating arrangement on mounting plate 1510, at least partially surrounding aperture 1344 formed therein.

Collimator plate 1500 is preferably located immediately beneath LED mounting plate 1510 and preferably includes an array of light collimators 1520, each light collimator 1522 of array of light collimators 1520 preferably cooperating with and being located longitudinally beneath a corresponding photon emitter on mounting plate 1510. In actuality, when constructing illumination assembly 1504, the density and arrangement of photon emitters 1330 is typically set in accordance with the practicable density with which array of light collimators 1520 may be constructed.

Here, by way of example, array of light collimators 1520 comprises a rectangular array, corresponding to the arrangement of photon emitters 1330. It is understood, however, that collimators 1522 may be arranged in any suitable configuration capable of providing the required collimation of light emitted by plurality of photon emitters 1330. By way of example, photon emitters 1330 on plate 1510 and collimators 1522 on plate 1500 may be arranged in hexagonal grids, alternative tightly packed formations or non-regular arrays, in accordance with system requirements and engineering considerations. It is further understood that collimator plate 1500 preferably constitutes a segment of a larger preferably planar sheet of light collimators, forming a part of collimator board 1352.

Figure 16:
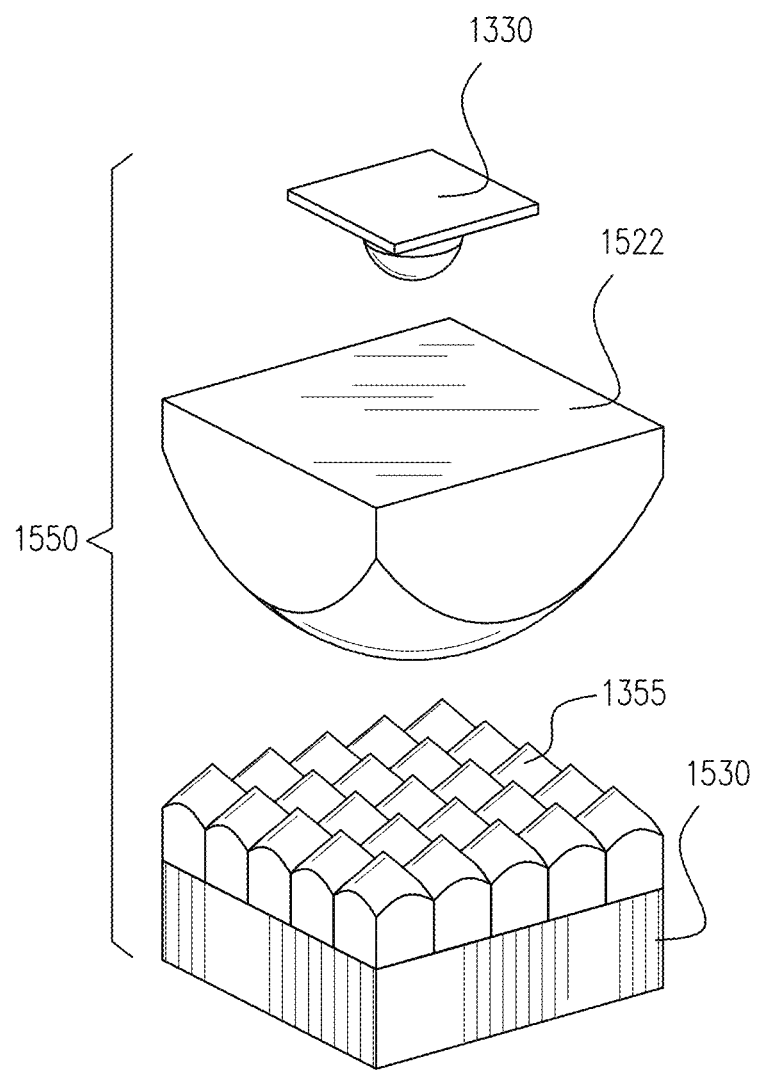
FIG. 16 is a simplified illustration of an optical illumination module of an illumination assembly of the type shown in FIGS. 15A-15C.

In accordance with the specific type of photon emitter employed, collimators 1522 may comprise one or more of spherical, circularly symmetric aspherical, cylindrical or free-form lenses or reflectors including Fresnel type counterparts of those optical elements. By way of example, collimator 1522 illustrated in FIGS. 15A and 16 is a single-element aspheric lens.

Array of axicons 1355 is preferably located immediately beneath collimator plate 1500 and preferably includes an array of light deflecting axicons, as seen most clearly in FIG. 15C showing an enlarged view thereof. Axicons 1355 may have a hexagonal, square or other shaped border, in order to allow tight packing thereof into an array. Array of axicons 1355 is preferably but not necessarily symmetrical with respect to aperture 1344. In the embodiment of array of axicons 1355 illustrated in FIG. 15C, all of axicons 1355 are shown to be mutually identical, with the same dimensions and cone angle. It is appreciated, however, that this is exemplary only and that axicons comprising array of axicons 1355 may be mutually different. For example, axicons 1355 may be of various dimensions and cone angles so as to generate light rings of more than one angle. Axicons suitable for use in the present invention may be of the type commercially available on a custom basis from Jungbecker Karl GmbH & Co., of Olpe, Germany; ALP Lighting Components Inc. of Niles, IL, USA; Bright View Technologies Corporation of Durham, NC, USA; Gaggione SAS of Montreal La Cluse, France; PowerPhotonic Ltd. of Fife, United Kingdom; and CDA GmbH of Suhl, Germany.

LED mounting plate 1510 is preferably fabricated as a printed circuit board (PCB) on which are additionally preferably mounted some or all of the LED driving electronic circuitry. Alternatively, LED mounting plate 1510 as well as collimator plate 1500, including the various optical elements mounted thereon, may be manufactured by three-dimensional printing techniques (e.g. by Luximprint V.O.F. of the Netherlands). Other known manufacturing techniques that may be employed for producing collimator elements 1522 include injection molded plastic, Computer Numerical Control (CNC) machining and glass molding. It is appreciated that illumination assemblies 1504 thus are preferably constructed of generally planar, readily manufacturable elements, which may be produced at low cost and be easily assembled.

Each vertical stack of photon emitter 1330, collimator 1522 and a corresponding portion 1530 of axicon array 1355 may be collectively termed an illumination module 1550. An exemplary illumination module 1550 is illustrated in FIG. 16, light output from which illumination module 1550 is shown in a highly simplified manner in FIG. 17. As appreciated from consideration of FIGS. 15A-17, light emitted by each photon emitter 1330 preferably propagates towards the corresponding collimator element 1522, which collimator element 1522 preferably collimates the light received thereat and produces a collimated light output. The collimated light output from collimator element 1522 preferably propagates towards the corresponding portion 1530 of array of axicons 1355.

Figure 17:
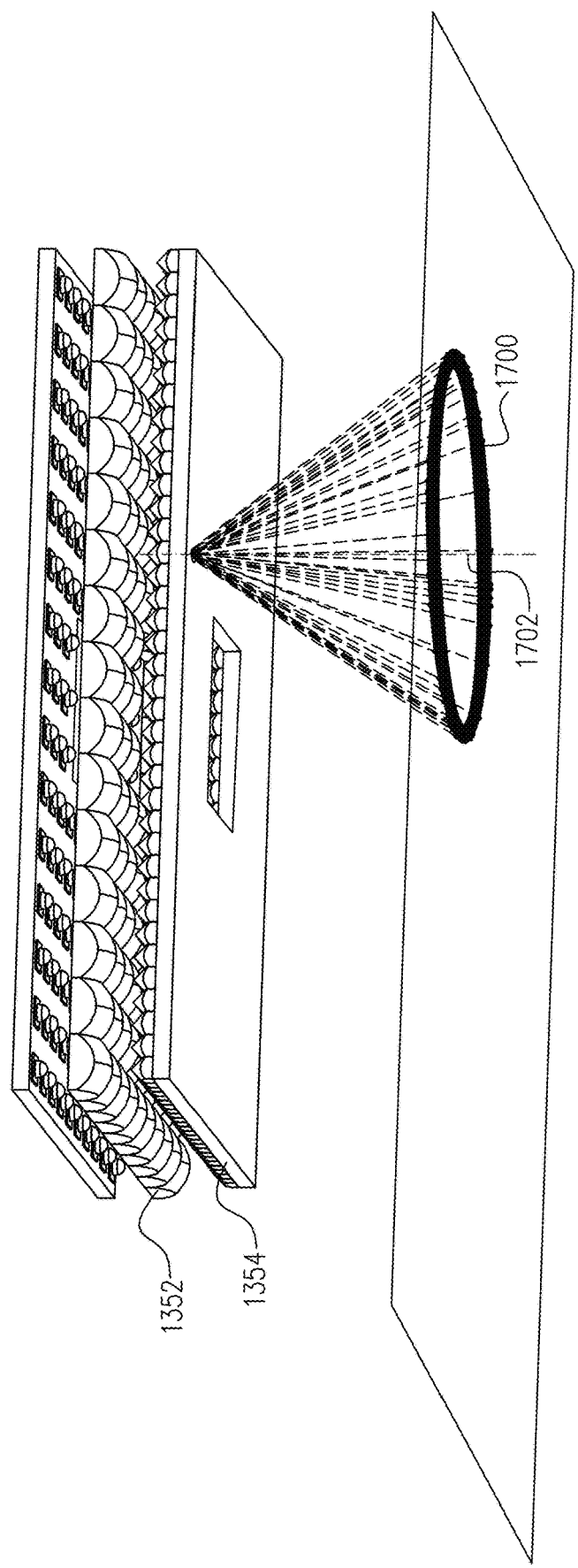
FIG. 17 is a simplified pictorial illustration of light output from an optical illumination module of the type shown in FIGS. 16.

Each axicon element in array of axicons 1355 is preferably functional to generate light output in the form of a conical surface 1700, as illustrated in FIG. 17. Due to the highly dense arrangement of array of axicons 1355, array of axicons 1355 preferably generates multiple, overlapping conical surfaces or rings of light. Axicon array 1355 is preferably structured and arranged such that the light rings generated thereby overlap and aggregate upon fields of view 1322, thereby illuminating fields of view 1322 and minimizing the amount of stray light falling on regions between fields of view 1322.

In accordance with a particularly preferred embodiment of the present invention, array of axicons 1355 comprises an array of axicons formed of molded transparent plastic material. The plastic material may comprise one or more of acrylic, polycarbonate, cyclic olefin polymer or any other optical grade plastic material that may be molded or shaped into a desirable optical design. Particularly, the use of polycarbonate is advantageous due to the relatively high refractive index thereof, enabling the achievement of large deflection angles. Axicons may be convex, as illustrated in FIGS. 15A-17. Additionally or alternatively, axicons may be concave.

Array of axicons 1355 may have a density in the range of 4-10000 axicon/cm². Axicons 1355 preferably have an apex angle in the range of 80° to 130° and a corresponding deflection angle in the range of 29°-12.5° in the case that array of axicons 1355 comprises acrylic plastic, and in the range of 35°-15° in the case that array of axicons 1355 comprises polycarbonate. It is appreciated, however, that these values are illustrative only and may be readily varied by one skilled in the art depending on the light output requirements of illumination module 1550. In particular, it is appreciated that there is a trade-off between the number of axicons included in array of axicons 1355 and the size of each axicon and that the design of array of axicons 1355 may be optimized in accordance with the functional requirements thereof.

As described hereinabove, each axicon conical prism in array 1355 projects a light beam propagating generally equally in all azimuthal directions with a narrow angle relative to an axicon axis 1702. This light beam preferably intersects the substrate surface with ring shaped light distribution 1700, as shown in FIG. 17. In contrast to other preferred embodiments of the present invention described hereinabove, the light output of array of axicons 1355 is not associated with any particular one of fields of view 1322. Rather, the light output of array of axicons 1355 is spread substantially evenly throughout the substrate area 1324 occupied by fields of view 1322. Light incident on regions between fields of view 1322 is thus wasted. However, due to the tightly packed arrangement of plurality of cameras 1320, the proportion of light so wasted is minimized.

It is appreciated that, for the sake of clarity, the light output of only a single axicon of the array 1355 is shown in FIG. 17. However, it is readily understood that generally similar although not necessarily identical light outputs are preferably projected by each axicon in array 1355. The collective effect of the light output of the entirety of array of axicons 1355, as observed from the viewpoint of each field of view 1322, is that of a ring-shaped angular spread of light having a well-defined angle relative to the axis 1326 of the telecentric lens 1380.

It is a particular advantage of this embodiment of the present invention that the irradiance provided by array of axicons 1355 is highly uniform and substantially spatially invariant, exhibiting minimal variation in intensity at different locations within each field of view 1322 illuminated thereby. The spatial invariance of the irradiance provided by array of axicons 1355 may be appreciated from consideration of FIG. 18, illustrating simulation results of the angular radiance projected by an illumination arrangement of the type illustrated in FIG. 17.

As seen in FIG. 18, the simulated angular radiance as seen at the center and corner of each of two fields of view 1322A and 1322B is plotted. Field of view 1322A is selected to lie in the middle row 1364 of the plurality of cameras 1320, whereas field of view 1322B is selected to lie in an edge row such as row 1362. As clear from a comparison of the angular radiance plots, the angular radiance as observed at various locations within and between each field of view 1322 is substantially uniform.

It is understood that the angular radiance plotted in FIG. 18 is a simulation of the radiance provided by an ideal array of axicons 1355, constructed and operative in accordance with a preferred embodiment of the present invention. As is appreciated by those skilled in the art, in actual practice the axicon array may comprise manufacturing variations and tolerances. By way of example, the actual axicon apex would be of finite radius of curvature rather than infinitely sharp as simulated and adjacent axicons would typically be separated by finite transition areas rather than being immediately abutting as simulated. These manufacturing tolerances may result in the formation of gaps within the ring-shaped radiance distributions shown in FIG. 18, thus degrading the uniformity and shift invariance of the illumination.

In order to minimize the formation of gaps within the ring-shaped radiance distributions projected by array of axicons 1355 in embodiments of the present invention, each axicon in array of axicons 1355 is preferably of very small dimensions relative to the separation between array of axicons 1355 and the corresponding fields of view 1322. By way of example, the separation between array of axicons 1355 and fields of view 1322 is preferably between about 10-100 times greater than a dimension of the base of each axicon. As a result, angular gaps in the radiance patterns projected by array of axicons 1355 are generally insignificant in relation to the light scattering properties of the substrate and the acceptance angle of imaging lens 1380.

In accordance with certain embodiments of the present invention, array of axicons 1355 may comprise axicons having generally the same optical properties. Alternatively, array of axicons 1355 may be formed of axicons having mutually different geometries, such as mutually different apex angles, and hence mutually different optical properties. By way of example, array of axicons 1355 may comprise interleaved axicons of two or more mutually different geometries, projecting two or more generally concentric angular radiance rings of mutually different deflection angles.

Interleaving may comprise alternating placing of a first type of axicon and a second type of axicon in accordance with a regularly or non-regularly repeating pattern. In certain embodiments, the interleaving may be differently structured depending on the location in relation to camera axes 1326.

Simultaneous provision of light rings of more than one deflection angle may be advantageous in applications where the features to be observed on the scanned substrate comprise a number of different reflection properties. In such a case, light having a small incidence angle with respect to camera axis 1326 may have the property of enhancing the edges of generally specularly reflecting surfaces such as metals. Light incident at relatively large angles may have the property of enhancing point defects such as scratches and dust particles. However, light incident at excessively broad angles may be undesirable due to reduced overall contrast.

It is understood that in the case that array of axicons 1355 comprises axicons of two or more geometries and hence deflection angles, each axicon of a first geometry presents a radiance gap within the angular ring of light generated by each axicon of a second geometry, as observed from field of view 1322. By way of example, an array of axicons 1355 may comprise a first type of axicon projecting light rings with a 15° deflection angle, interleaved with a second type of axicon projecting light rings with a 35° deflection angle. As viewed from field of view 1322 in the direction of the 35° radiance ring, each bright spot is observed as emanating from the second type of axicon of 35° deflection angle, located at the direction of observation. The first type of 15° deflection angle axicon, located adjacent to the 35° deflection angle axicon, would be perceived as a dark spot in the 35° deflection angle projected light ring, since the 15° deflection angle axicon contributes to the 15° radiance ring.

Similarly, as viewed from field of view 1322 in the direction of the 15° radiance ring, each bright spot is observed as emanating from the first type of axicon of 15° deflection angle, located at the direction of observation. The second type of 35° deflection angle axicon, located adjacent to the 15° deflection angle axicon, would be perceived as a dark spot in the 15° deflection angle projected light ring, since the 35° deflection angle axicon contributes to the 35° radiance ring.

However, provided a relatively dense array of axicons is employed, the above-described radiance gaps may be made to be small enough to be of negligible significance for a given application.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. An image acquisition device comprising:
a first plurality of cameras arranged in a mutually spaced configuration, each having a field of view, each of said fields of view lying in a plane;
an illumination platform having an upper surface and a lower surface, said upper surface being proximal to said first plurality of cameras, said lower surface being distal from said first plurality of cameras, wherein a multiplicity of apertures is formed in said illumination platform, each of said apertures allowing viewing therethrough of said field of view by said camera;
a second plurality of photon emitters arranged in a multiplicity of generally circumferential arrangements, each of said generally circumferential arrangements illuminating one of said fields of view, said second plurality of photon emitters being mounted on said lower surface, each of said generally circumferential arrangements, when projected on said plane of said field of view illuminated thereby, circumferentially surrounding said field of view; and
at least one photon emitter of at least one of said generally circumferential arrangements directing light to at least one other of said fields of view in addition to said field of view illuminated by said at least one generally circumferential arrangement.

2. The image acquisition device according to claim 1, wherein said mutually spaced configuration of said first plurality of cameras comprises a staggered array of rows of said cameras, said fields of view of said first plurality of cameras being at least partially overlapping when viewed in a direction generally perpendicular to a direction of said rows.

3. The image acquisition device according to claim 1, wherein said plane is a common plane occupied by each of said fields of view.

4. The image acquisition device according to claim 3, wherein said plane coincides with a surface of a substrate to be imaged by said image acquisition device.

5. The image acquisition device according to claim 1, wherein each of said cameras defines a camera axis, each of said generally circumferential arrangements being centrally intersected by said camera axis.

6. The image acquisition device according to claim 1, wherein said photon emitter comprises an LED.

7. The image acquisition device according to claim 1, wherein each of said generally circumferential arrangement comprises at least one ring of said photon emitters, wherein said at least one ring of photon emitters comprises an inner ring of photon emitters and an outer ring of photon emitters, said inner and outer rings being generally concentric.

8. The image acquisition device according to claim 7, wherein said photon emitters comprising said inner ring emit light of a first wavelength and said photon emitters comprising said outer ring emit light of a second wavelength, said first and second wavelengths being mutually different.

9. The image acquisition device according to claim 8, wherein said photon emitters comprising said inner ring are IR LEDs and said photon emitters comprising said outer ring are amber LEDs.

10. The image acquisition device according to claim 1, wherein each of said generally circumferential arrangements of photon emitters circumferentially surrounds each of said apertures, wherein each of said cameras comprises a telecentric lens.

11. The image acquisition device according to claim 10, wherein each of said apertures is generally rectangular.

12. The image acquisition device according to claim 1, further comprising at least one collimator coupled to said at least one photon emitter, wherein said at least one collimator is mounted on a collimator board, wherein said collimator board is located adjacent to said illumination platform between said illumination platform and said plane.

13. The image acquisition device according to claim 12, further comprising at least one deflecting element coupled to said at least one collimator, wherein said at least one deflecting element is mounted on a deflector board, wherein said deflector board is located abutting said collimator board.

14. The image acquisition device according to claim 13, wherein said deflector board is formed monolithically with said collimator board.

15. The image acquisition device according to claim 13, wherein said at least one collimator is coupled to said at least one photon emitter of said generally circumferential arrangement directing light to at least one other field of view in addition to said field of view illuminated by said generally circumferential arrangement,
said at least one deflecting element directing said light to said at least one other field of view in addition to said field of view illuminated by said generally circumferential arrangement.

16. The image acquisition device according to claim 15, wherein said at least one deflecting element comprises at least one prism having a plurality of exit facets angled to direct said light towards said at least one other field of view in addition to said field of view illuminated by said generally circumferential arrangement.

17. An image acquisition device comprising:
a first plurality of cameras arranged in a mutually spaced configuration, each having a field of view, each of said fields of view lying in a plane;
an illumination platform having an upper surface and a lower surface, said upper surface being proximal to said first plurality of cameras, said lower surface being distal from said first plurality of cameras, wherein a multiplicity of apertures is formed in said illumination platform, each of said apertures allowing viewing therethrough of said field of view by said camera; and
a second plurality of photon emitters arranged in a multiplicity of arrangements about each of said cameras of said first plurality of cameras, said second plurality of photon emitters being mounted on said lower surface;
at least one photon emitter of said second plurality of photon emitters directing light to said field of view of at least one of said first plurality of cameras that is not the closest field of view thereto.

18. The image acquisition device according to claim 17, wherein said mutually spaced configuration of said first plurality of cameras comprises a staggered array of rows of cameras, said fields of view of said first plurality of cameras being at least partially overlapping when viewed in a direction generally perpendicular to a direction of said rows.

19. The image acquisition device according to claim 17, wherein said plane is a common plane occupied by each said field of view.

20. The image acquisition device according to claim 19, wherein said plane coincides with a surface of a substrate to be imaged by said image acquisition device.

21. The image acquisition device according to claim 17, wherein each of said cameras defines a camera axis, each of said arrangements being intersected by said camera axis.

22. The image acquisition device according to claim 17, wherein each of said photon emitters comprises an LED.

23. The image acquisition device according to claim 17, wherein each of said arrangements of photon emitters surrounds each of said apertures.

24. The image acquisition device according to claim 17, wherein each of said cameras comprises a telecentric lens.

25. The image acquisition device according to claim 24, wherein each of said apertures is generally rectangular.

26. The image acquisition device according to claim 17, further comprising at least one collimator for collimating said light, wherein said at least one collimator is mounted on a collimator board, wherein said collimator board is located adjacent to said illumination platform between said illumination platform and said plane.

27. The image acquisition device according to claim 26, further comprising at least one deflecting element for directing said light output by said at least one collimator.

28. The image acquisition device according to claim 27, wherein said at least one deflecting element comprises a third plurality of axicons.

29. The image acquisition device according to claim 28, wherein said third plurality of axicons comprises an array of axicons having a density of between 4-10000 axicons/cm$^2$.

30. The image acquisition device according to claim 28, wherein said third plurality of axicons comprises axicons having mutually similar optical properties.

31. The image acquisition device according to claim 28, wherein said third plurality of axicons comprises axicons having mutually different optical properties.

* * * * *